United States Patent
Wallace, Jr.

(10) Patent No.: US 6,601,170 B1
(45) Date of Patent: Jul. 29, 2003

(54) SECURE INTERNET USER STATE CREATION METHOD AND SYSTEM WITH USER SUPPLIED KEY AND SEEDING

(76) Inventor: Clyde Riley Wallace, Jr., 5241 Savoy Ct., Cape Coral, FL (US) 33904

( * ) Notice: Subject to any disclaimer, the term of this patent is extended or adjusted under 35 U.S.C. 154(b) by 0 days.

(21) Appl. No.: 09/545,009

(22) Filed: Apr. 7, 2000

Related U.S. Application Data

(63) Continuation-in-part of application No. 09/475,638, filed on Dec. 30, 1999, now abandoned.

(51) Int. Cl.[7] ................................................. H04L 9/00

(52) U.S. Cl. ....................... 713/168; 713/165; 713/166; 713/200

(58) Field of Search ............................... 713/165, 166, 713/168, 182, 200, 201

(56) References Cited

U.S. PATENT DOCUMENTS

| | | |
|---|---|---|
| 5,081,678 A | 1/1992 | Kaufman et al. |
| 5,329,623 A | 7/1994 | Smith et al. |
| 5,706,427 A | 1/1998 | Tabuki |
| 5,774,670 A | 6/1998 | Montulli |
| 5,835,724 A | 11/1998 | Smith |
| 5,845,070 A | 12/1998 | Ikudome |
| 5,848,412 A | 12/1998 | Rowland et al. |
| 5,892,902 A | 4/1999 | Clark |
| 5,910,986 A | 6/1999 | Dove |
| 5,961,593 A | 10/1999 | Gabber et al. |
| 5,966,441 A | 10/1999 | Calamera |
| 5,995,625 A | 11/1999 | Sudia et al. |
| 6,005,939 A | 12/1999 | Fortenberry et al. |
| 6,006,333 A | 12/1999 | Nielsen |
| 6,047,268 A | 4/2000 | Bartoli et al. |

OTHER PUBLICATIONS

Unknown author, "What Went Wrong? So if Cookies Are so Much of a Nuisance Why Was [sic] They Developed in the First Place?" Cookie Central, Date: at least by Dec. 4, 1999, http://www.cookiecentral.com/cookies5.htm.

Macavinta, "Privacy Fears Raised by DoubleClick Database Plans", CNET News.com, Jan. 25, 2000, http://news.cnet.com/news/0-1005-202-1531929.html.

Unknown author, "Charges in Theft of Data," I.T., Feb. 1, 2000, wysiwyg://65/http://www.it.fairfax.com.au/e-commerce/20000201/A56734-2000Jan31.html.

Kimber, "Thieves Trick Crackers Into Attacking Networks", Tech Web, Feb. 16, 1999, http://www.techweb.com/wire/story/TWB19990216S0008.

Lemos, "Hackers Won't Work New Year's: Two Hacker Groups Give 'Props' to Uncle Sam, but of Course They Hack Sites to do it", Alta Vista Live, Dec. 22, 1999, http://live.av.com/scripts/editorial.dl...erid=159085998&userpw=.&uh=159085998.0.

(List continued on next page.)

*Primary Examiner*—Thomas R. Peeso
(74) *Attorney, Agent, or Firm*—George F. Wallace; Thomas M. Champagne; IP Strategies, P.C.

(57) ABSTRACT

A method and system for creating secure Internet user states between one or more servers and one or more users. The invention is carried out by a server receiving over the Internet from a user private data relating to the user and a user key; creating an encryption key from the user key; encrypting the private data with the encryption key; assigning the encrypted private data to the data field of a cookie; and sending the cookie back to the user's computer for storage, so that when the user later requests data from the server or a related server, the cookie is sent back by the user's computer to the server or related server, which extracts the encrypted private data; receives the user key; recreates the encryption key; decrypts the encrypted private data with the encryption key and uses the decrypted private data to establish an Internet state between that server and the user. Optionally, the private data may be seeded by a server prior to encryption and assignment.

72 Claims, 24 Drawing Sheets

$i \geq 1, j \geq 1$

OTHER PUBLICATIONS

Walker, "New Web Device Offers 'Undercover' Surfing", Washington Post, Jan. 24, 2000, Sec. 11G, http://www.herald.com.

Norton, "Freedom 1.0," ZDNET, Dec. 23, 1999, http://www.zdnet.com/filters/printerfriendly/0,6061,2413285–50,00.html.

Elgin, "Will Privacy Pay Your Bills?" ZDNET, Nov. 23, 1999, http://www.zdnet.com/sr/stories/news/0,4538,2398784.html.

Vaughan–Nichols, "New Hotmail Hole Discovered", ZDNET, Sep. 23, 1999, http://www.zdnet.com/filters/printerfriendly/0,6061,2333253–79,00.html.

Reiter, "Hotmail Accounts Exposed, A Massive Security Breach Left Millions of Private Hotmail Accounts Open to Inquiring Eyes", ZDNET, Aug. 30, 1999, wysiwyg://47/http://www.zdnet.com/zdtv/...crime/news/story/0,3700,2324191,00.html.

MacLachlan, "Microsoft Plugs Hotmail Hole", Tech Web, Aug. 30, 1999, http://www.techweb.com/printableArticle?doc_id=TWB19990830S0021.

Unknown author, "Cookie Crusher", The Limit Software, Date: at least by Feb. 10, 2000, http://www.thelimitsoft.com/cookie.html.

Unknown author, "How Secure is Passport?", Microsoft Passport, Date: at least by Apr. 28, 2000, http://memberservices.passport.com/HELP/MSRV_HELP_howsecure.asp.

Strom, "Cookie Coda", Summit Online Web Management, Date: at least by Sep. 11, 1999, http://www.summitonline.com/webmanage/papers/strom86.html.

Unknown author, "Persistent client State HTTP Cookies", Netscape, Inc., Date: at least by Apr. 27, 2000, http://home.netscape.com/newsref/std/cookie_spec.html.

Unknown author, "An Overview/Stream Ciphers," Date: at least by Dec. 22, 1999, http://www.hack.gr/users/djj/crypto/overview/streamciphers.html.

Kenworthy, "Keep Out! Private—Safeguard Your Data From Prying Eyes That Can Peruse Your PC, and See What You've Been up to," Windows Magazine, 1997, No. 810, Dialog File 647.

Deutsch, "Russians Plead Guilty to Web Fraud," Excite News, Dec. 20, 1999, wysiwyg://9/http://news.excite.com/news/ap/991220/21/internet–fraud.

MacLachlan, "Microsoft Addresses IE 5.0 Security Concerns," Tech Web, Mar. 17, 1999, http://www.techweb.com/wire/story/TWB19990317S0019.

Middleton, "MSN Messenger Has E–Mail Security Flaw," Tech Web, Aug. 20, 1999, http://www.tech.com/wire/story/TWB19990820S0006.

Kornblum, "Software Tries to Fool Cookies," CNET News.com, Jun. 23, 1997, http://news.cnet.com/news/0–1005–200–319922.html.

Kristol, "RFC 2109: HTTP State Management Mechanism," Network Working Group, Feb. 1997, http://www.cis.ohio–state.edu/htbin/rfc/rfc2109.

Kenworthy, "Cookie Crumbs—There's no Reason to Keep the Ingredients of Your Browser Cookies Secret; Our Utility Tells You What's Inside", Windows Magazine, 1998, No. 909, Dialog File 647.

Whiting, "Getting to Know You—Companies Are Beginning to Understand What Makes Online Customers Tick, Hoping to Turn Surfers Into Buyers", Information Week, Mar. 13, 2000, Dialog File 275.

Newton, "Hide Your E–Mail Tracks with New Privacy Tool", PC World, Mar. 2000, vol. 18, No. 3, Dialog File 275.

Merlino, "Internet Privacy—You Are Not Alone; Here's Who's Really Watching, What You Can Do to Protect Yourself, and What Can Happen if You Don't", Computer Life, Jun. 1, 1998, vol. 5, No. 6, Dialog File 233.

Dalton, "OPS: Answer to Cookies?", Information Week, 1997, No. 652, Dialog File 648.

Unknown author, "Cookies, Pros & Cons", CSULB.edu, Date: at least by Feb. 10, 2000, http://www.engr.csulb.edu/~lluong/cecs470/procon.html.

Petruk, "Re: Embedding the Authenticate Dialog Box", Deja.com, Apr. 14, 1997, http://x40.deja.com/[ST_rn...&CONTEXT=950197229.1316356102&hitnum=25.

Lin, "Re: Encrypting Cookies", Deja.com, Jul. 14, 1997, http://x40.deja.com/[ST_rn=ps]/getdoc.x...&CONTEXT=950197229.1316356102&hitnum=73.

Gal–Oz, "Re: Security", Deja.com, Aug. 28, 1997, http://x40.deja.com/[ST_rn=ps]/getdoc.x...&CONTEXT=950197229.1316356102&hitnum=149.

Laidman, "Re: How to Encrypt a String", Richard Walker's Hot ASP, Feb. 15, 1999, http://www.aspalliance.com/richardwalker/forum/messages/60.asp.

Unknown author, "Security Features", Nomina Net, Date: at least by Feb. 10, 2000, http://www.nomina.net/security.html.

Unknown author, "Government Speaks Out on Cookies," Cookie Central, Date: at least by Dec. 4, 1999, http://www.cookiecentral.com/creport.htm.

Festa, "Government OKs Net Cookies," CNETNews.com, Mar. 16, 1998, http://www.cnet.com/news/0–1003–200–327461.html?pt.ms...ticker.ne_adc.

Unknown author, "An Overview/New Technologies," New Technologies, Date: at least by Dec. 22, 1999, http://www.hack.gr/users/djj/crypto/overview/new.html.

U.S. Dept. of Energy, "I–034: Internet Cookies," U.S. DOE Computer Incident Advisory Capability, Mar. 12, 1998, http://www.ciac.org/ciac/bulletins/I–034.shtml.

Kaufman, "Credit Card Cookies," Cookie Central, Oct. 1, 1998, http://www.cookiecentral.com/board/messages/705.html.

Unknown author, "Cookie Values," Cookie Central, Date: at least by May 25, 2000, http://www.cookiecentral.com/mim03.htm.

Frederick, "Re: How to Encrypt and Decrypt Cookies," Cookie Central, Mar. 27, 1999, http://www.cookiecentral.com/board/messages/1252.html.

Richard F., "Re: Cookies and Password Protection," Cookie Central, Jan. 19, 1998, http://www.cookiecentral.com/board/messages/59.html.

Fred, "Fiction Not Fact!," Cookie Central, Dec. 8. 1999, http://www.cookiecentral.com/board/messages/3105.html.

Unknown author, "Hide Your Cookies," Cookie Central, Date: at least by Feb. 8, 2000, http://www.cookiecentral.com/dsclm.htm.

Unknown author, "Is There Any Way to Code Password in a Cookie so No One Can Read It?" Internet Related Technologies, Date: at least by Feb. 10, 2000, http://developer.irt.org/script/600.htm.

Salmon, "Security Bug: Password in plaintext cookie," Ultimate Bulletin Board, Nov. 16, 1998, http://www.prime–web.com/ubb/Forum16/HTML/000279.html.

McCullagh, "Critics Blast MS Security", Wired News, May 16, 2000, http://www.wired.com/news/technology/0,1282, 36336,00.html.

Nelson, "RealNames Warns Customers of Hack Attack," Tech Web, Feb. 15, 2000, http://www.techweb.com/wire/story/TWB20000215S0001.

Kerstetter, "'Window Spoofing' Bug Hits Communicator," ZDNET, Feb. 18, 1999, http://www.zdnet.com/eweek/stories/general/0,11011,1013941,00.html.

Bott, "Data Creep", ZDNET, Date: at least by Mar. 31, 2000, http://www.zdnet.com/pccomp/stories/all/0,6605,2434574,00.html.

Unknown author, "Cookie Exploit," Cookie Central, Dec. 14, 1998, http://www.cookiecentral.com/bug/index.shtml.

Bailey, "Modem Operandi FAQt: Persistent Cookies," Modem Operandi, Date: at least by Dec. 31, 1996, http://www.vermontguides.com/faqteg14.htm.

Dornan, "New Viruses Search For Strong Encryption Keys", Tech Web, Mar. 15, 1999, http://www.techweb.com/wire/story/TWB199990315S0001.

Quain, "How to Conceal Your Cookies", Fast Company, Issue 5, Date: at least by Jan. 11, 2000, http://www.fastcompany.com/online/05/web2.html.

Whalen, "The Unofficial Cookie FAQ v. 2.53", Cookie Central, Date: last modified May 10, 1999, http://www.cookiecentral.com/faq/index.shtml.

Goulart, "Re: Cookies that record keystrokes", Cookie Central, Sep. 18, 1999, http://www.cookiecentral.com/board/messages/2453.html.

Darrow, "Security Woes Continue for Microsoft; The Security Hits Just Keep on Coming for Microsoft", Tech Web, Sep. 1, 1999, http://www.techweb.com/wire/story/TWB19990901S0020.

Yasin, "App Security Vaults To Fore", Internet Week, Sep. 6, 1999, Issue 779, Section: News and Analysis, http://www.techweb.com/se/directlink.cgi?INW19990906S0005.

Lash, "Netscape Patents Crypto Protocol", CNET News.com, Sep. 16, 1997, http://news.cnet.com/news/0-1003-200-322194.html?tag=.

Walker, "Re: How to Encrypt a String,"Richard Walker's Hot ASP, Feb. 15, 1999, http://www.aspalliance.com/richardwalker/forum/messages/61.asp.

Author unknown, "Freedom 1.0 Specification Sheet", Freedom Net, Date: at least by Feb. 1, 2000, http://www.freedom.net/info/specs.html.

Unknown author, "Netscape's Communicator third party cookie option foiled", Cookie Central, Date: at least by Feb. 9, 2000, http://www.cookiecentral.com/dsc3.htm.

Zou, "How to Encrypt and De–encrypte Cookies", Cookie Central, Jan. 25, 1999, http://www.cookiecentral.com/board/messages/1005.html.

$k \geq 1$ user key 100

| G | o | o | s | e |   | G | o | s | s | a | g | e | 1 | 2 | 3 | v_set 300

| F | o | o | t | B | a | l | l | m_set 500

| 17 | 33 | 9 | 25 | 41 | 9 | 1 | 41 | 1 | 33 |

$i = 8$ $k = n * i + 1$, where $n = 0$ initially
and $n = n + 1$ after replacement

Fig. 4a (Pre-Replacement)

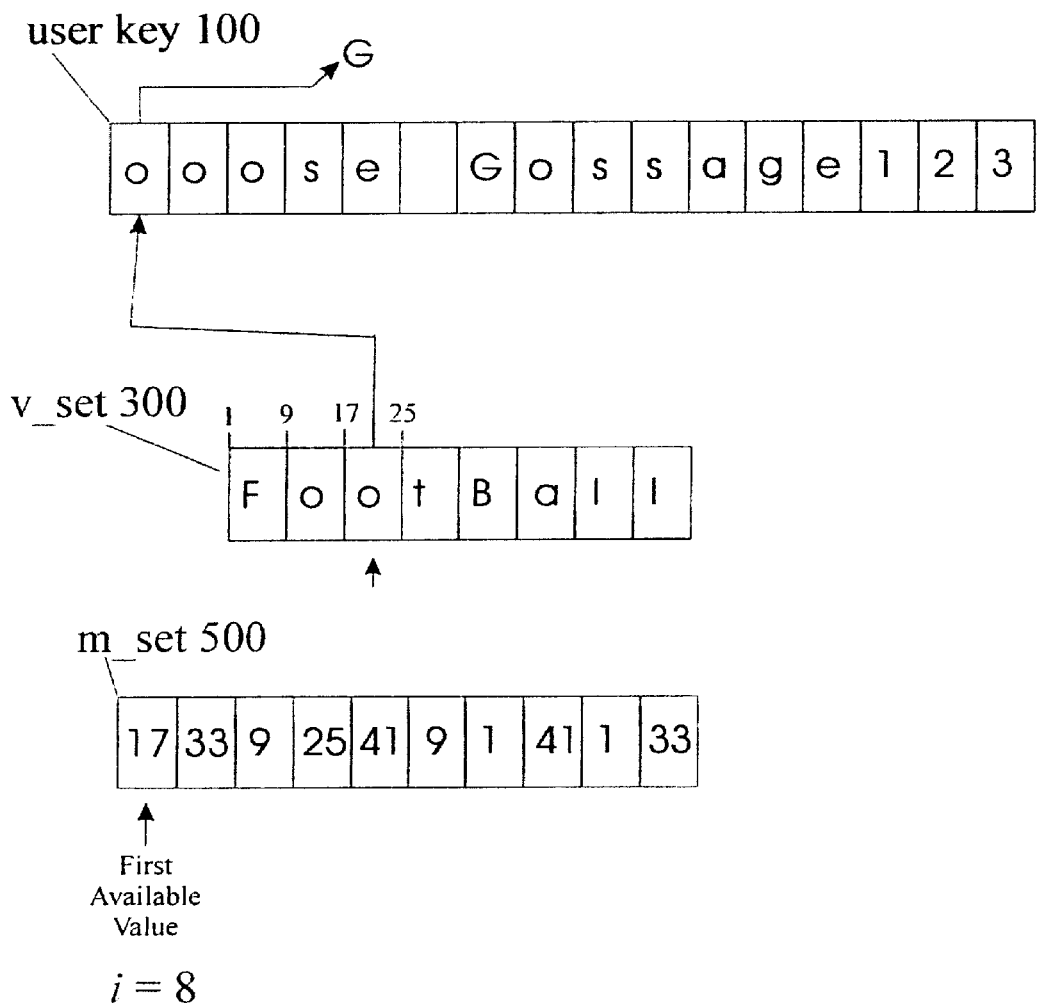
Fig. 4b (Replacement, n=0)

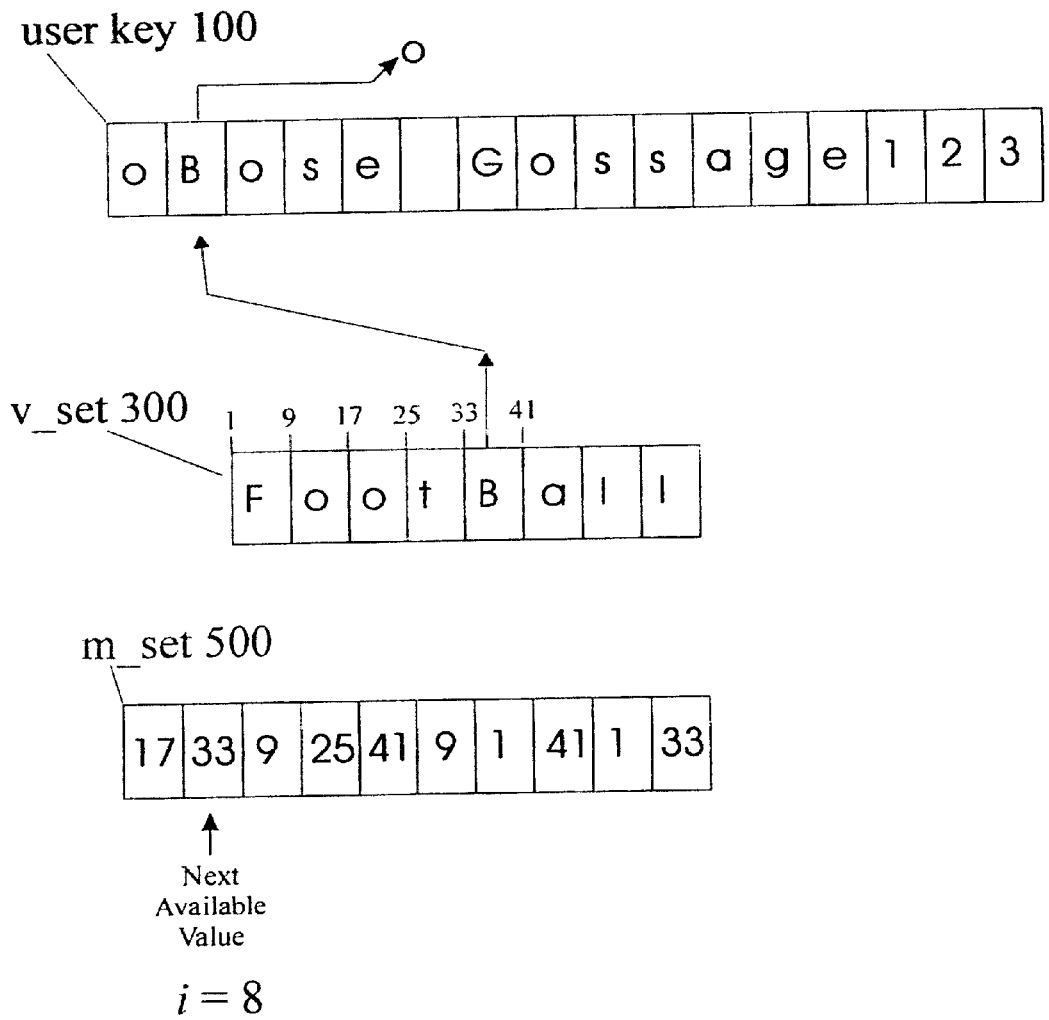
Fig. 4c (Replacement, n=1)

user key 100

| G | o | o | s | e |   | G | o | s | s | a | g | e |

0  8  16  24  32           64                    104 i_set 200

| 8 | 16 | 8 | 32 | 24 | 8 | 8 | 32 | k_set 400

| 1 | 41 | 9 | 41 | 17 | 9 | 1 | 25 | 33 | 9 | v_set 300

| F | o | o | t | B | a | l | l |

Fig. 5a (Pre-Insertion)

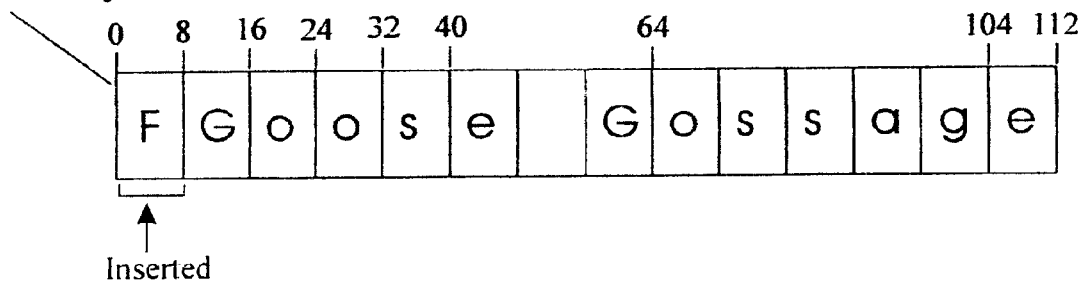
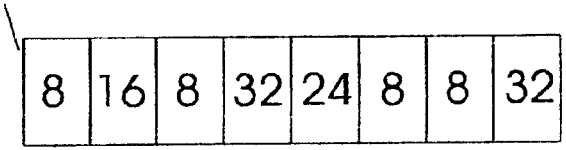
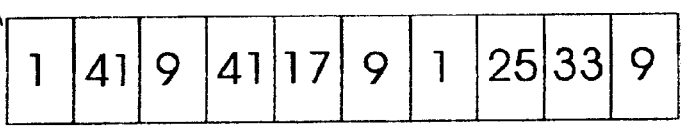
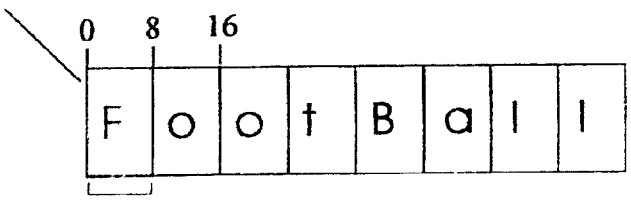
Fig. 5b (First Insertion)

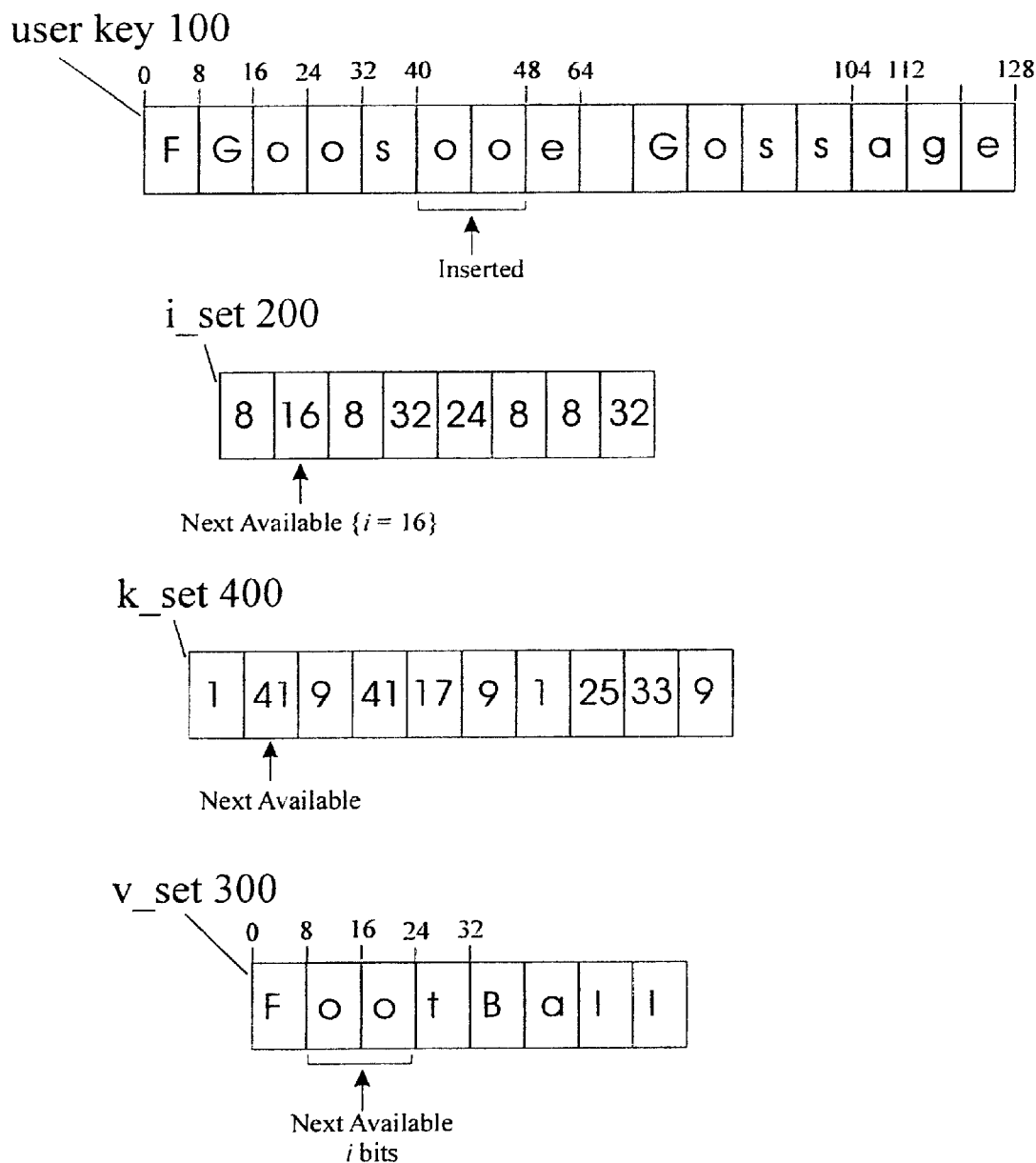
Fig. 5c (Second Insertion)

user key 100

| 0 | 8 | | | | | | | | | | | | | | | | 168 |
|---|---|---|---|---|---|---|---|---|---|---|---|---|---|---|---|---|---|
| G | o | o | s | e | | G | o | s | s | a | g | e | | i | s | | H | e | r | e | i_set 200

| 8 | 16 | 8 | 32 | 24 | 8 | 8 | 32 |
|---|---|---|---|---|---|---|---| k_set 400

0  8

| 1 | 41 | 9 | 41 | 17 | 9 | 1 | 25 | 33 | 9 |
|---|---|---|---|---|---|---|---|---|---|

Fig. 6a (Pre-Deletion)

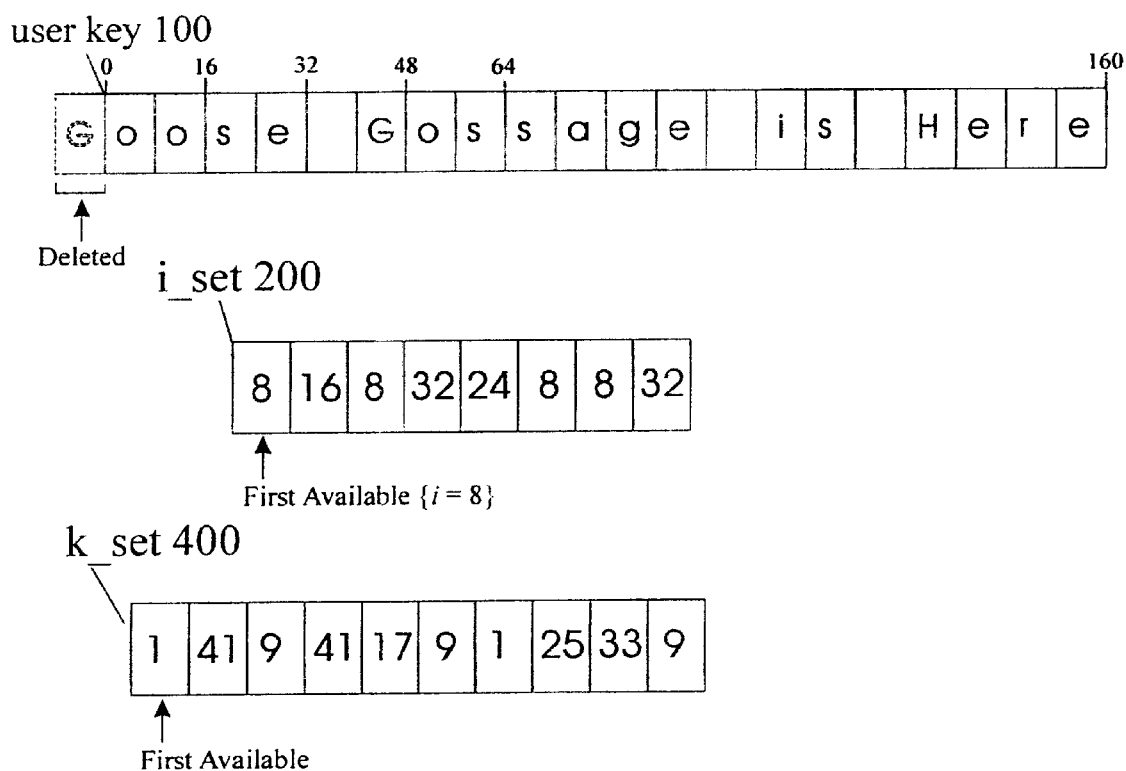
Fig. 6b (First Deletion)

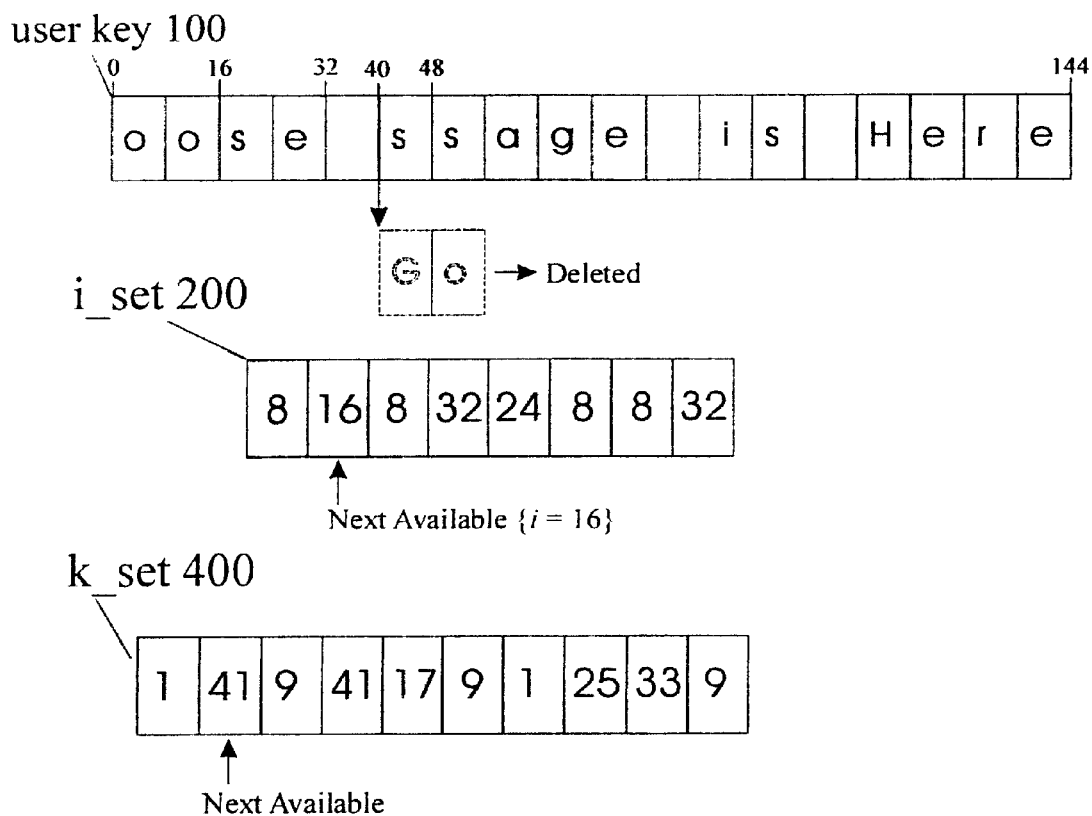
Fig. 6c (Second Deletion)

user key 100
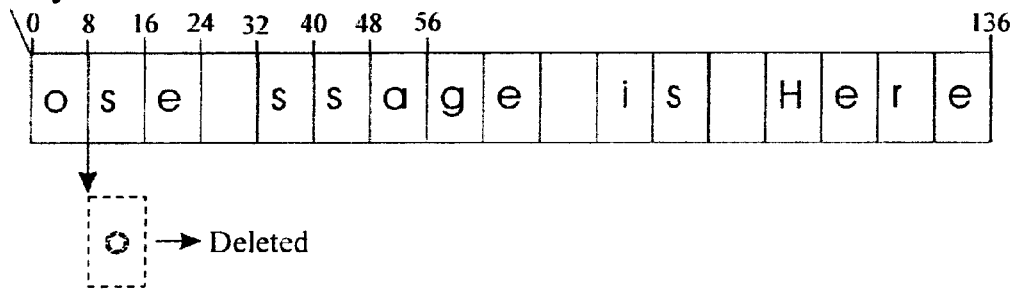
i_set 200
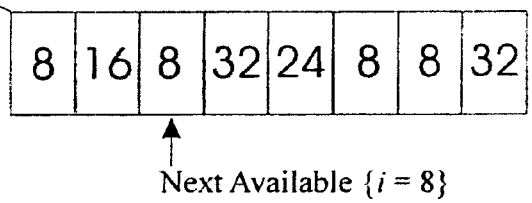
k_set 400
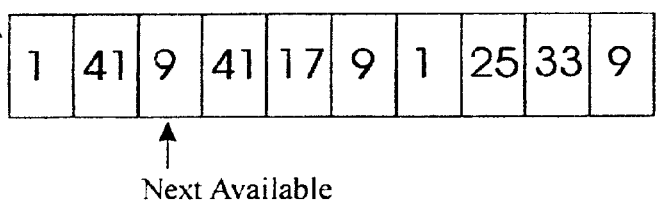
Fig. 6d (Third Deletion)

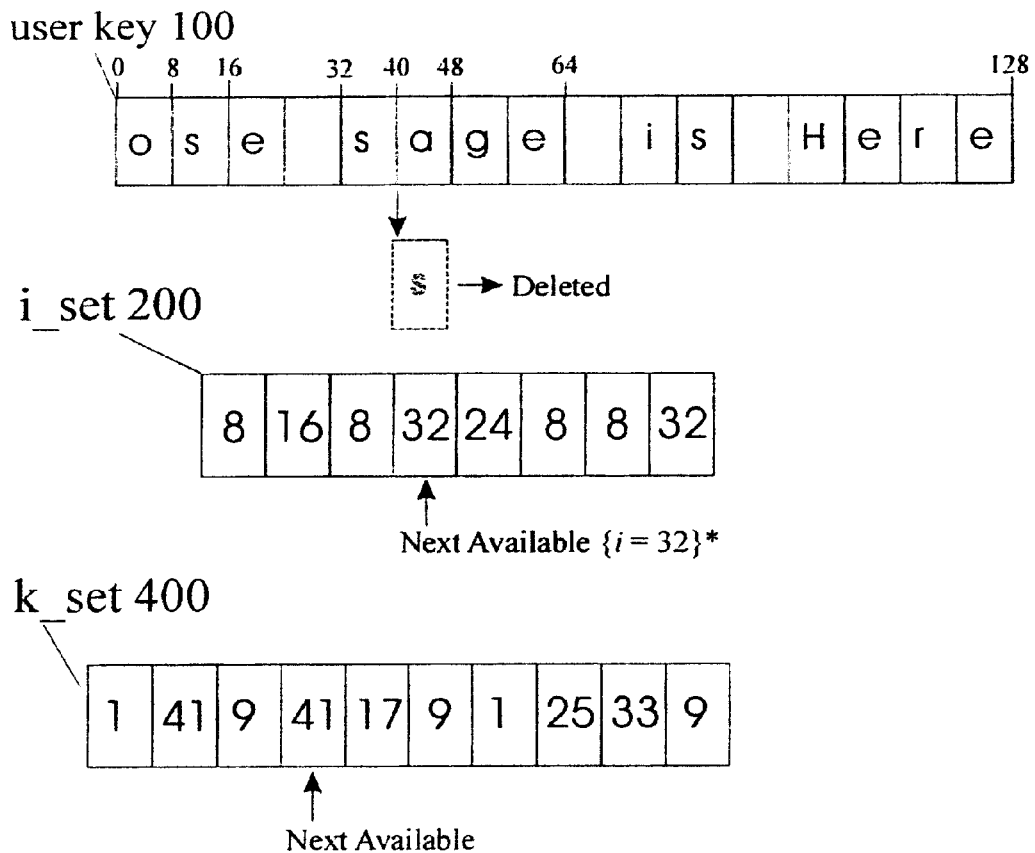
Fig. 6e (Fourth Deletion)

user key 100

| 0 | 8 | 16 | 24 | 32 | 40 | 48 | | | | | | | | 128 |
|---|---|---|---|---|---|---|---|---|---|---|---|---|---|---|
| G | o | o | s | e | | G | o | s | s | a | g | e | 1 | 2 | 3 | i_set 200

| 8 | 16 | 8 | 32 | 24 | 8 | 8 | 32 |
|---|---|---|---|---|---|---|---| k_set 400

| 1 | 41 | 9 | 41 | 17 | 9 | 1 | 25 | 33 | 9 |
|---|---|---|---|---|---|---|---|---|---| m_set 500

| 17 | 33 | 9 | 25 | 41 | 9 | 1 | 41 | 1 | 33 |
|---|---|---|---|---|---|---|---|---|---|

Fig. 7a (Pre-Rearrangement)

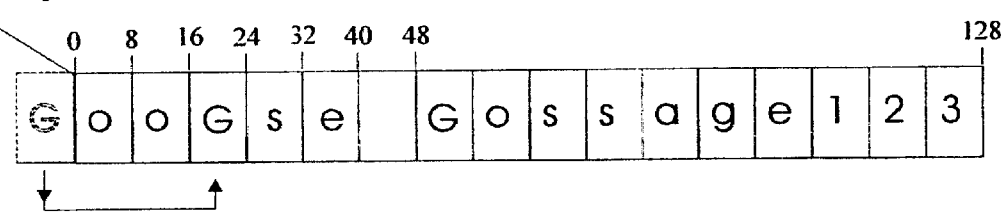
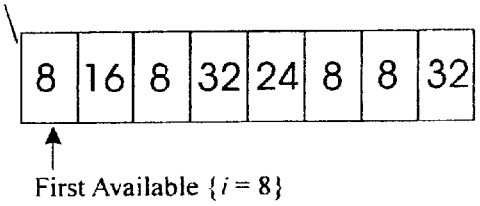
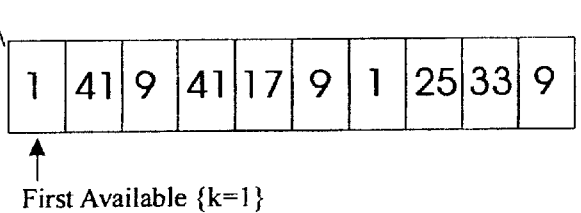
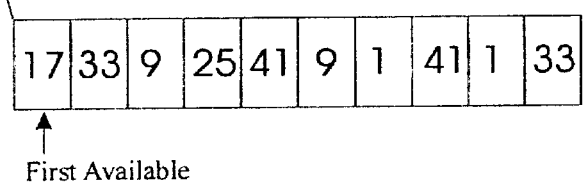
Fig. 7b (First Rearrangement)

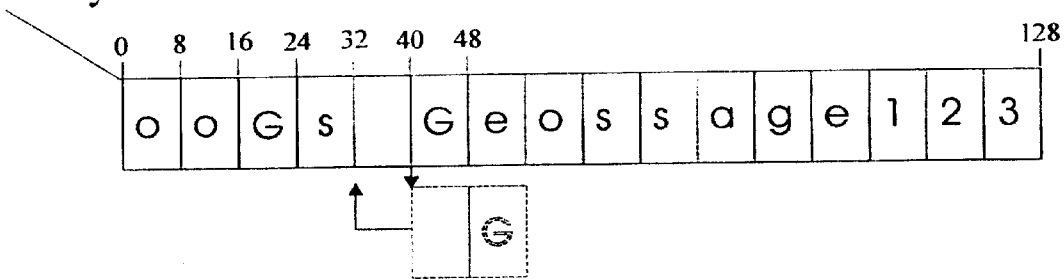
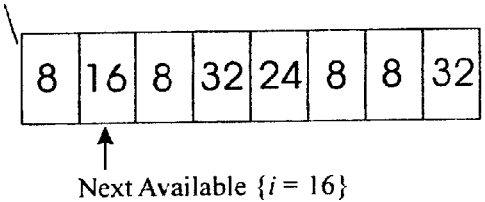
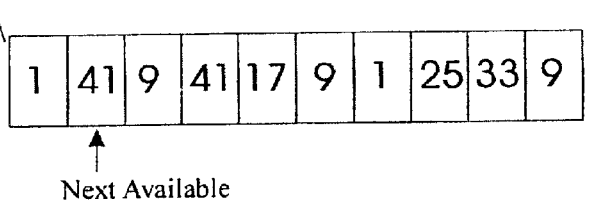
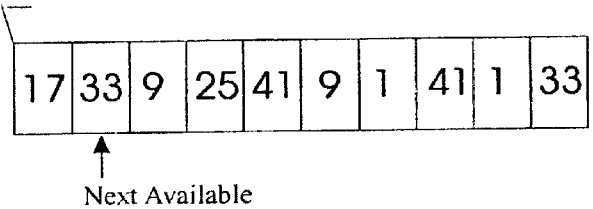
Fig. 7c (Second Rearrangement)

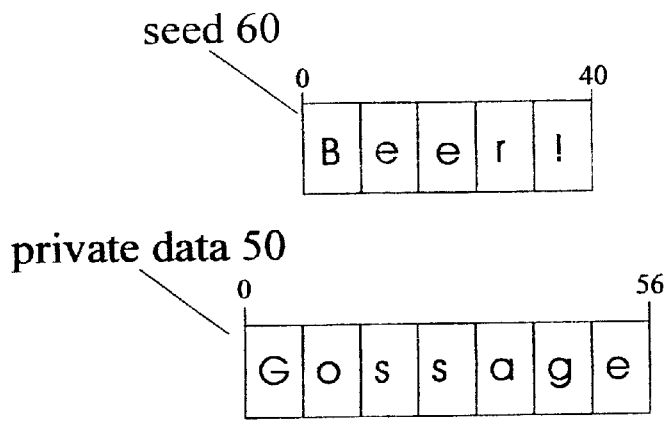
Fig. 8a (Pre-Seeded)
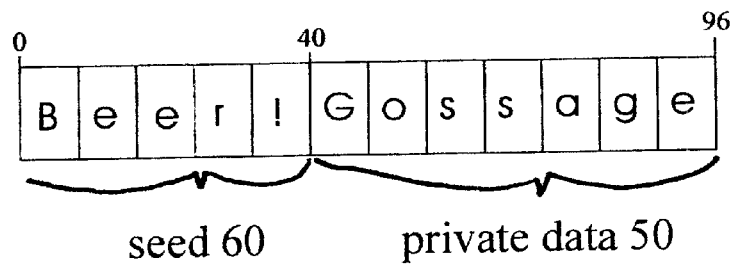
Fig. 8b (Seeded)

SECURE INTERNET USER STATE CREATION METHOD AND SYSTEM WITH USER SUPPLIED KEY AND SEEDING

CONTINUING AND INCORPORATION DATA

This application is a CIP of application Ser. No. 09/475,638 entitled METHOD AND SYSTEM FOR CREATING SECURE INTERNET USER STATES having a filing date of Dec. 30, 1999 now abandoned. Application Ser. No. 09/475,638 is hereby incorporated by reference in its entirety.

This application is related to, and incorporates by reference in their entirety, the following applications:
application Ser. No. 09/491,225 entitled KEY-BASED METHOD AND SYSTEM FOR CREATING SECURE INTERNET USER STATES having a filing date of Jan. 25, 2000; and
application Ser. No. 09/491,059 entitled KEY-BASED METHOD AND SYSTEM WITH KEY INDEX FOR CREATING SECURE INTERNET USER STATES having a filing date of Jan. 25, 2000.

FIELD OF INVENTION

The present invention relates to Internet user states and privacy, and more particularly to a key-based method and system with user key and optional seeding for creating secure Internet user states between one or more servers and one or more users.

BACKGROUND OF THE INVENTION

The Internet is well known in the art. Generally, the Internet is a network of computers that spans most of the world. The Internet uses the HTTP protocol. Because HTTP is a stateless, or non-persistent, protocol, it is not possible for web servers to differentiate between visits by a specific user unless the web server can somehow mark the user to create a state or logical nexus between the web server and a specific user. Thus, each visit by an Internet user to a website is unique, in that the website does not generally know the identity of the user and/or other information about the user, with the exception of a few details such as browser type, IP address, etc. It should be noted, however, that when a user has a fixed IP address, the user's identity or information about the user may be known by logical relation to a database. But, since the majority of Internet users are assigned dynamic IP addresses each time they connect to the Internet, reliance on a user's IP address to create a state is problematic since their IP addresses may change each time a user connects to the Internet.

To remedy the problem of HTTP's stateless nature, cookies have been introduced for the specific purpose of creating states. They may be temporary, in which case they are stored only in memory; or persistent, in which case they are stored in a file, typically on a hard drive, for period of time measured by an expiration date field of a cookie. A cookie may be thought of as a data structure stored in the memory or on the storage device of a user's computer, with the cookie containing data, such as the user's identity and/or other information about the user for the purpose of creating a state between the web server and the user. Thus, when a user visits a particular website, a cookie stored on a user's computer may be sent from the user's computer over the Internet to the web server, which then extracts the data from the cookie, processes the data and therewith creates a state. For example, a user's name may be stored in a cookie and when that user visits a particular website, the data contained in the cookie may be sent to the server and used to identify the user.

More specifically and typically, when a user first visits an Internet website, a web server associated with the website may send a cookie to the user, which is then stored in the memory or on the hard drive of a user's computer, in conjunction with the user's Internet browser software. When the user subsequently visits the website, the cookie may be sent back to the server so that the user's identity and/or other information about the user that is stored in the cookie may be known to the server via the data contained in the cookie, such that a state between the user and the web server is created.

However, the use of cookies has created a significant problem relating to user privacy. Because these cookies are stored on a user's computer, especially when on a hard drive, other servers may potentially access the cookies of other servers and extract and read the user's identity and/or other information about the user that is stored in those cookies. Such extracting and reading is considered by many as an invasion of the user's privacy.

An attempted solution to protect the privacy of Internet users is provided in RFC 2109, HTTP STATE MANAGEMENT MECHANISM, having a publication date of February, 1997. This solution involves a domain restriction on reading and writing cookies, which must be implemented in conjunction with a user's particular browser software for effectuation. For example, a web server associated with the domain thissite.com may write a cookie having the domain value .thissite.com. According to the domain restriction, this cookie may only be read by a server within the specified domain and related sub-domains. For example, while the servers at thissite.com, L1.thissite.com, L2.L1.thissite.com, etc. may read the cookie having the domain value .thissite.com, the servers othersite.com, L1.othersite.com, L2.L1.othersite.com may not read the cookie having the domain value .thissite.com. While this methodology appears adequate on its face, practically it is not. It suffers from at least four deficiencies.

A first problem is that this methodology requires software vendors producing browser software to implement this domain restriction. While mainstream vendors may attempt to comply, other smaller vendors may not. Thus, failed compliance may create a hole through which a user's privacy may be invaded via the unauthorized access of cookies despite the existence of a domain restriction.

A second problem is that despite attempted compliance, one or more bugs or exploits in the browser software may exist and be exploited; thus, also creating a hole through which a user's privacy may be invaded. For example, as identified in the article, COOKIE EXPLOIT, published by COOKIE CENTRAL™ on Dec. 14, 1998, such a bug did exist and a hole was potentially created and exploited. The bug allowed cookies to be shared between unrelated domains, despite the domain restriction implemented by some if not all cookie-based Internet browser applications. Basically, by concatenating an ellipse (" . . . ") at the end of the domain value set in a cookie, other unrelated servers were able to read those cookies. Such a domain value may be ".thissite.com . . . " According to this article, at the time of publication all mainstream Internet browser applications were vulnerable to this exploit. Indeed, the article goes on to assert that the most popular Internet browser applications, INTERNET EXPLORER™ and NETSCAPE™, were known to be vulnerable on the WINDOWS™, MAC™ and LINUX™ platforms. Thus, the domain restriction was nullified and servers participating in the exploitation of this bug were able to access cookies from domains outside their own domain, which is exactly what the domain restriction of RFC 2109 was intended to prevent. Thus, the privacy of Internet users benefiting from the use of cookies was unequivocally subject to invasion.

A third problem is that the cookies stored on a user's hard drive may be viewed by a person who is physically using the user's computer. The location and naming of cookie files stored on a user's hard drive are generally known or discoverable by those skilled in the art. For example, it is well known in the art that the browser software application NETSCAPE™ that is developed and distributed by NETSCAPE COMMUNICATIONS CORPORATION™ generally stores cookies in a user directory in a single file named "cookie.txt". One physically using a user's computer may open such a file with a simple text editor and directly view and/or print the data contained in all cookies present, which is clearly an invasion of the user's privacy.

A fourth problem is that under certain conditions servers may directly read cookie files outside the domain restriction set in the cookies. It is generally known in the art that where a user's Internet browser software is configured to enable JAVA script, specific files having a known name (such as, "cookies.txt") may be directly accessed, read and transmitted to some location over the Internet by a "virus" embedded within such JAVA script. Additionally, a devious program may also contain such a virus that can do the same. Many Internet users download and run executable programs from the Internet knowingly and unknowingly risking the infection of a virus; and therefore, this risk is present and real. The location of cookie files are generally known or discoverable to those ordinarily skilled in the art. Indeed, such a virus may execute a "directory" command to obtain the names of files and directories on a hard drive; for example, a directory listing of files and directories in the "c:\windows\Temporary Internet Files" directory or "c:\Program Files\Netscape\Users" directory. The former may produce cookie files produced by INTERNET EXPLORER; while the latter may produce the names of the directories of users of NETSCAPE (i.e., John), which may be used to access the NETSCAPE cookie file, which in this case would be "c:\Program Files\Netscape\Users\John\cookies.txt". Indeed, the surreptitious harvesting of cookies files is available to those seeking it; and the privacy of Internet users are subject to invasion.

Another attempted solution is practiced by some industry participants. This attempted solution involves storing in persistent cookies a primary key (or database index) to a database containing data records of user information, rather than storing the private data in the persistent cookies. Thus, the unauthorized viewing or reading of a primary key does not appear to be an invasion of privacy. While some, including the public, may consider such a practice as sufficient in protecting user privacy from invasion, practically it is insufficient and provides a false sense of security.

By definition, primary keys are unique within a defined universe. Thus, within a defined universe of Internet users, a single primary key uniquely identifies one or more database records that relate to a specific user. Where the contents of a database are known or obtained by a party (i.e., possessed, or hacked into and harvested), an Internet user, within the defined universe, visiting a website associated with that party risks an invasion of privacy. If the user has a primary key stored in a persistent cookie on the user's hard drive, access to that cookie may allow information relating to the user in the database to be referenced and used by the party to establish an undesired state between the website and the user. In addition, other information about the user that may be harvested during the visit from other cookies stored on the user's hard drive may be combined with the user's data in the database. For example, the database may only contain the user's name, address and phone number. But data harvested from the user's other cookies may reveal that the user had visited a website associated with herbal treatments for those with HIV, a website associated with HIV treatment centers in the user's town and a website associated with HIV research. By combining this health-related data with the database data, the name, address and phone number of a person who appears to have HIV is now known. Where the person does in fact have HIV and sought to keep his or her ailment private, this combined information results in the person's privacy being clearly invaded.

Therefore, there is a need to efficiently create secure Internet user states between web servers and Internet users in order to protect the privacy of Internet users from invasion while overcoming the deficiencies and contrary teachings presented in and by the prior art.

Application Ser. No. 09/475,638 ("CC#1") discloses a method and system for creating secure Internet user states between one or more servers and one or more Internet users. The invention disclosed therein is carried out by receiving by a server over the Internet from a user private data relating to the user via user input; assigning by the server the private data in encrypted format to the data field of a cookie; and sending the cookie back to the user's computer for storage, so that when the user later requests data from the server, the cookie is sent back by the user's computer to the server, which extracts the encrypted private data, decrypts the encrypted private data and uses the decrypted private data to establish an Internet state between the server and the user based on the decrypted private data.

Application Ser. No. 09/491,225 modifies CC#1 by, inter alia, utilizing a keybased encryption algorithm to encrypt private data relating to a user, and thereafter storing the encrypted data and the encryption key used to encrypt the data in the data field of a cookie.

Application Ser. No. 09/491,059 modifies CC#1 by, inter alia, utilizing a keybased encryption algorithm to encrypt private data relating to a user, and thereafter storing the encrypted data and an index associated with the encryption key used to encrypt the data in the data field of a cookie.

SUMMARY OF THE INVENTION

An object of the present invention is to protect the privacy of Internet users by protecting private user data used for establishing Internet user states.

Another object of the present invention is to protect the privacy of Internet users by protecting private user data used for establishing Internet user states without requiring implementation of new Internet protocols.

Another object of the present invention is to protect the privacy of Internet users by protecting private user data used for establishing Internet user states without requiring additional compliance by Internet browser software vendors.

Another object of the present invention is to protect the privacy of Internet users by protecting private user data used for establishing Internet user states despite the existence of Internet browser software bugs that allow unauthorized access to user cookies.

Another object of the present invention is to protect the privacy of Internet users by protecting private user data used for establishing Internet user states despite the existence of an unauthorized person physically viewing the contents of a user's cookies.

Another object of the present invention is to protect the privacy of Internet users by protecting private user data used for establishing Internet user states despite the unknown existence on an Internet user's computer of a program or script that transmits to a remote server the cookies stored on the user's computer.

Another object of the present invention is to divide control over the decryption of encrypted private data stored in cookies between Internet users and Internet servers, in that both a user and a server must each supply a key to decrypt the data.

The present invention is a method and system for creating secure Internet user states between one or more servers and one or more Internet users. The invention is carried out by receiving by a server over the Internet from a user private data relating to the user via user input, accessing a user key associated with the user, creating an encryption key from the user key, encrypting said private data with the encryption key, assigning by the server the encrypted private data to the data field of a cookie, and sending the cookie back to the user's computer for storage; so that when the user later requests data from the server or a related server, the cookie is sent back by the user's computer to that server, which extracts the encrypted private data, receives the user key over the Internet from the user, re-creates the encryption key from the user key, decrypts the encrypted private data with the encryption key and uses the decrypted private data to establish a state between that server and the user. Optionally, the present invention may include seeding the private data prior to encryption and assignment.

Other desires, features, and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which:

FIG. 4a shows in a preferred embodiment a user key prior to a series of replacement steps.

FIG. 4b shows a user key after a first replacement step.

FIG. 4c shows a user key after a second replacement step.

FIG. 5a shows a user key prior to a series of insertion steps.

FIG. 5b shows a user key after a first insertion step.

FIG. 5c shows a user key after a second insertion step.

FIG. 6a shows a user key prior to a series of deletion steps.

FIG. 6b shows a user key after a first deletion step.

FIG. 6c shows a user key after a second deletion step.

FIG. 6d shows a user key after a third deletion step.

FIG. 6e shows a user key after a fourth deletion step.

FIG. 7a shows a user key prior to a series of rearrangement steps.

FIG. 7b shows a user key after a first rearrangement step.

FIG. 7c shows a user key after a second rearrangement step.

FIG. 8a shows a seed and private data in a preferred seeding embodiment prior to the combining of a seed with private data.

FIG. 8b shows a seed and private data in a preferred seeding embodiment after the seed is combined with private data.

DETAILED DESCRIPTION

A method and system for creating secure Internet user states between one or more servers and one or more users is herein disclosed.

Figure 1:
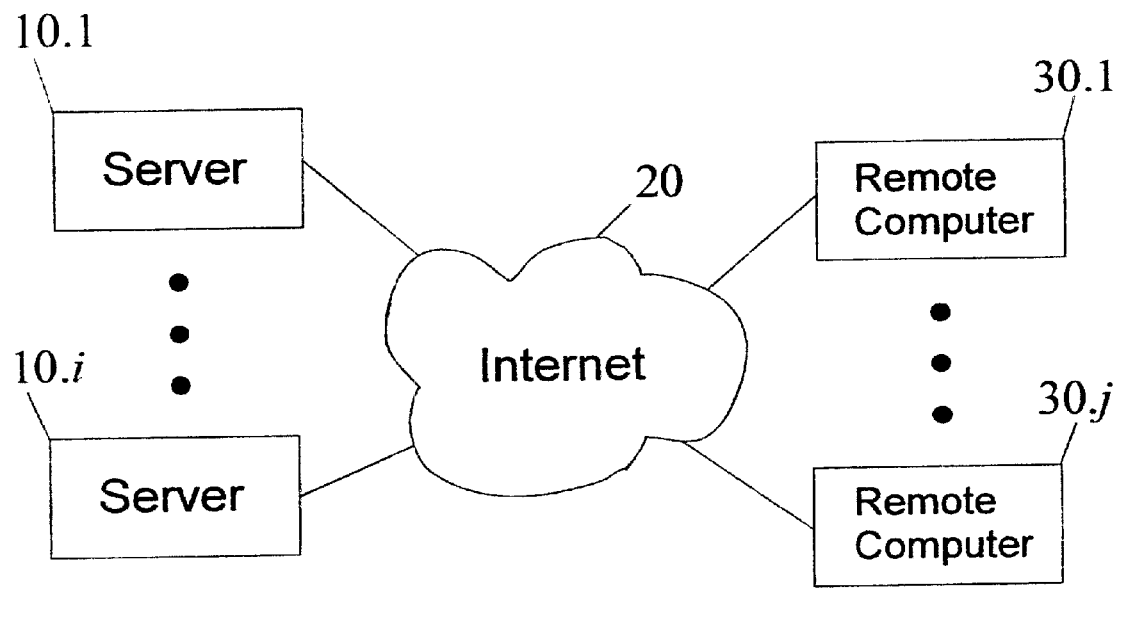
FIG. 1 shows the general environment of the present invention, in which one or more servers are connected to one or more remote computers via the Internet or other HTTP-based-network.

FIG. 1 shows the environment of the present invention, in which one or more servers $10.1–10.a$ (for $a \geq 1$) are operatively connected via the Internet 20 (or other network) to one or more remote computers $30.1–30.b$ (for $b \geq 1$).

Generally, the present invention is carried out via software executing on one or more servers, software executing on one or more remote computers, and user input via one or more input devices operably connected to a user's remote computer.

The private data of a user is herein broadly defined. This includes the user's IP address, name, mailing address, email address, age, sex, credit card information, login/password combinations, preferences, hobbies, education level, browsing (click) history, browsing history with click frequency, browsing preferences, assigned primary keys, assigned GUIDs, etc. In essence, private data relating to a user includes any information that may in and of itself be personal and private, as well as information that may be personal and private when combined with other data relating to the user. According to the present invention, the utmost care must be used to protect user privacy. Thus, all data to be stored in user cookies are to be considered private data.

According to the present invention, a remote computer, associated with an Internet user, comprises an operable Internet connection, Internet software, one or more computer memories for readably storing said Internet software, one or more input devices and a CPU for executing said Internet software, wherein said computer Internet connection, each of said one or more computer memories, each of said one or more input devices and said computer CPU are operatively connected to each other by at least one bus. Preferably, a remote computer has at least two computer memories: RAM and a hard drive; and at least two input devices: a pointing device and a keyboard.

According to the present invention, a server comprises an operable Internet connection, one or more server memories for readably storing server software and cryptography software, and a CPU for executing said server software and said cryptography software, wherein said server CPU, each of said server memories and said server Internet connection are operatively connected to each other by at least one bus. Preferably, a server has at least two server memories: RAM and a hard drive. However, since software may be stored solely in RAM, the required software may be loaded into RAM from a removable storage device (e.g., hard drive) or storage medium (e.g., diskette or data cartridge), with the device or medium subsequently being removed.

The server software and cryptography software executing on a server may be implemented with any compatible programming language and/or script that functionally effectuates the present invention as claimed.

The cryptography software according to the present invention may perform encryption and/or decryption. Generally, the cryptography software performs both encryption and decryption; however, where a first server only encrypts data and other related servers decrypt data, cryptography software need not perform both. The cryptography software may utilize any key-based encryption algorithm, or combination of algorithms in whole or in part, known in, taught by or obvious in light of the prior art that effectuates the present invention as claimed. However, it is essential that the overall functionality of the encryption algorithm used is one-to-one, in that the initial data results from decryption of an encrypted format of the initial data. An illustrative set of example prior art encryption algorithms and techniques from which one may draw one or more, in whole or in part, in effectuating the present invention are RSA; DSA; Diffie-Hellman; Public-Key Cryptography; PGP; Signature Algorithms; DES; triple-DES; IDEA; TDEA; Blowfish; Twofish; Yarrow; Square; TEA; CAST-128; RC4; Safer SK-128; Block Ciphers, including TWOFISH; Stream Ciphers; MD2, MD4, MD5 and other techniques based on the Secure Hash Standard (SHS) or Secure Hash Algorithm (SHA-1); Digital Timestamps Supporting Digital Signatures; Secret Sharing Schemes, including Blakley's Secret Sharing Scheme, Shamnir's Secret Sharing Scheme and Visual Secret Sharing Schemes; Interactive Proofs; Zero-Knowledge Proofs; Message Authentication Codes; Quantum cryptography; and known or obvious variations and combinations thereof In a preferred embodiment, PUKALL's 128-bit stream cipher algorithm is used in effectuating the present invention, as it is known to execute with relatively great speed with small text-based data; was conveniently published by ALEXANDER PUKALL in 1991 (see http://www.multimania.com/cuisinons/pc1/index.html); and by its express terms, may be used freely even for commercial applications. Use of this algorithm is highly suggested because of its fast processing speed, high encryption strength (128-bit keys) and minimal cost (free).

According to the present invention, associated with each user is an encryption key, which is used to encrypt private data relating to the user. An encryption key may be any number of bits consistent with the particular encryption algorithm used. However, it is important to note that the larger the key size, the stronger the encryption. The most common sizes of encryption keys are evenly divisible by eight (e.g., 40bit, 56bit, 64bit, 80bit, 128bit, 160bit, 256bit, 512bit, 1024bit, etc.); however other sizes may be used to the extent desirable and consistent with the particular encryption algorithm used. In a preferred embodiment, 128bit encryption keys are used. As described below, an encryption key is created by a server from a user key, therefore, an encryption key need not be, and preferably is not, archived in any computer storage device to help prevent theft thereof.

USER KEY

According to the present invention, associated with each user is a user key. A user key is a value having one or more bits in length. Preferably, a user key has a number of bits evenly divisible by eight; and conveniently, ASCII characters, which represent eight bits of data, may be used. In a preferred embodiment, a user key is between 48 and 256 bits in length (i.e., between 6 and 32 ASCII characters).

A user key may be archived in a memory or storage device of a server (or related server) or a user computer. Preferably, however, a user key is either memorized or otherwise recorded in a non-computer-based fashion by the user for later reference (e.g., writing it down on a piece of paper); and specifically, not archived in any computer memory or on any computer storage device.

According to the present invention, a user key may be generated by a server or selected by a user. Preferably, a user key is selected by a user, which may make the user key easier to remember by its associated user.

Where a user key is generated by a server, the server may either select the user key from a predefined set of possible user keys; or randomly generate the user key in any known or obvious way consistent with the present invention. The server may then send the user key to the user over the network so that the user may memorize or otherwise record the user key for later reference. Preferably, a server sends a generated key to a user over a secure connection, such as SSL.

Where a user key is selected by a user, the user may input one or more bits of data in any known or obvious way. Preferably, a user may input one or more ASCII characters via an input device in any known or obvious way, such as by typing or selecting one or more characters with a keyboard or clicking one or more grid fields of a grid representing ASCII characters (all ASCII character) with a pointing device (e.g., a mouse, trackball, touch pad, etc.). In a preferred embodiment, a user is sent form data by a server over the network that presents the user with a form containing a data field for input of one or more bits or characters, the form being displayed on the user's display device via browser software; and upon submission of the form, the bits or characters being posted to a CGI program or script or similar program or script located on the server via transmission back over the Internet to the server. Preferably, a user sends a user key to a server over a secure connection, such as SSL.

Figure 2A:
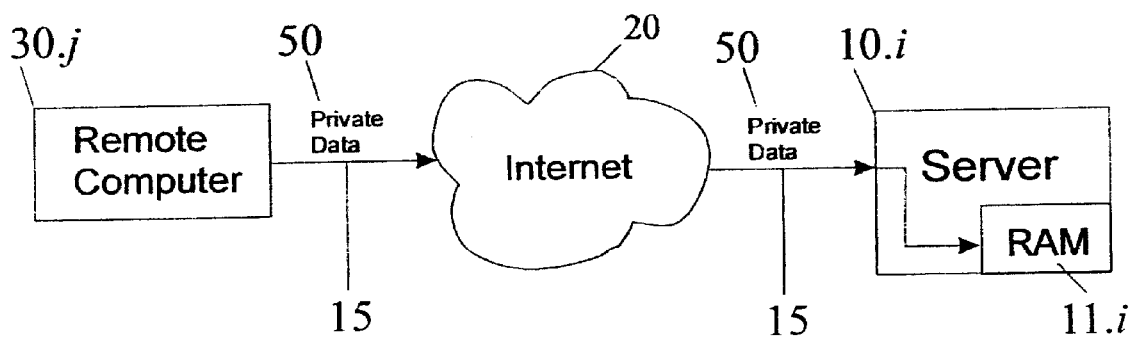
FIG. 2a shows the sending of private data by a remote computer over the Internet to a server according to the present invention.
Figure 2B:
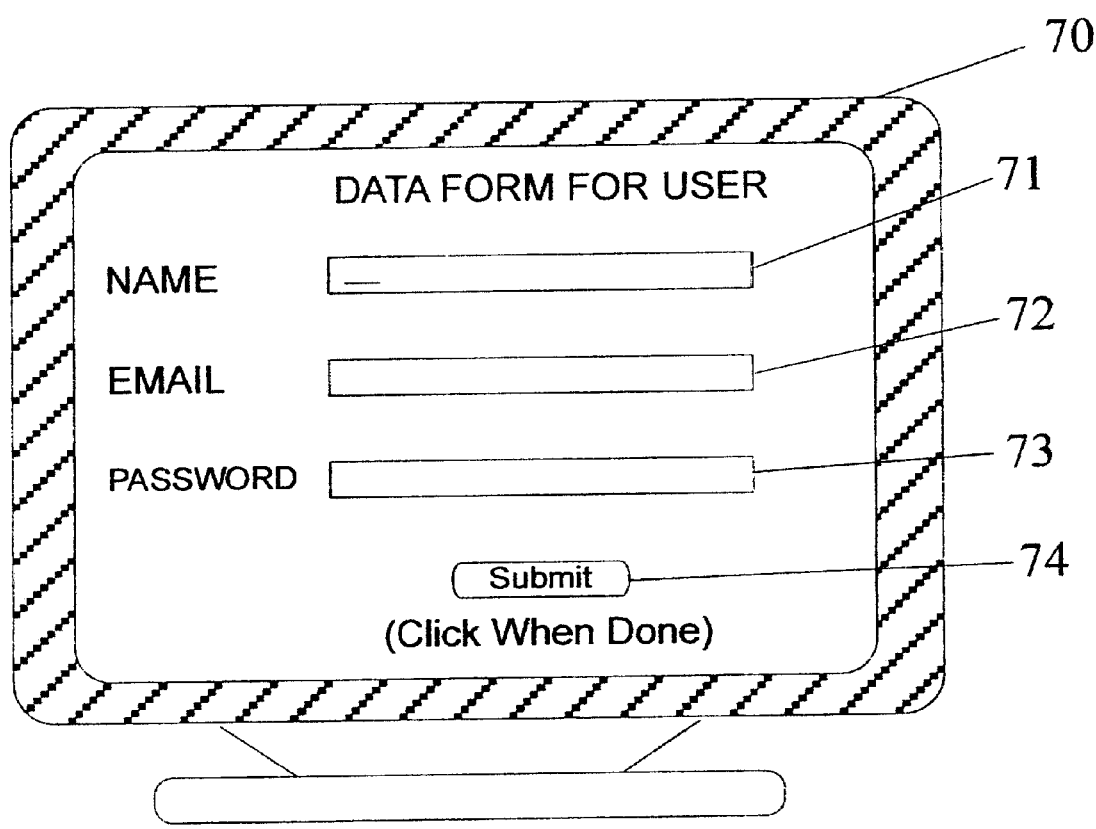
FIG. 2b shows a form containing data fields including a field for inputting of a user key.

As shown in FIG. 2b, a user key field 73 may be displayed on a user's display device 70 for a user to enter a user key. Further, a submit button 74 may be provided for submission of the form.

ENCRYPTION KEY

According to the present invention, a server may create an encryption key having e bits ($e \geq 1$) from a user key having u bits (u≧1) in any particular way that is repeatable, in that the same encryption key will be re-created by the server or related server each time given the same user key. According to the present invention, an encryption key may be created from a user key by inserting one or more bits into the user key, deleting one or more bits from the user key, replacing one or more bits of the user key with one or more bits, and/or rearranging one or more bits of the user key. It should be noted that any combination of insertions, deletions, replacements and rearrangements may be employed to the extent an encryption key of size e is created and the combination is repeatable.

In a preferred embodiment, the following program logic may be used to create an encryption key having e bits (e≧1) from a user key having u bits (u≧1): If u=e, then replace at least one bit of the user key with its converse, resulting in u=e. If u<e, then replace at least one bit of the user key with its converse, and then insert one or more bits into the user key until u=e. If u>e, then delete one or more bits from the user key until u=e, and then replace at least one bit of the key with its converse, which results in u=e. Optionally, rearrange two or more bits of a user key.

In a broad sense, creation according to the present invention may be effectuated solely through one or more insertions and/or one or more deletions. For example, the rearrangement and replacement of bits are combinations of at least one insertion and at least one deletion.

Thus, according to the present invention, insertion, deletion, replacement and rearrangement may be employed to the extent desired and regardless of the size relationship between u and e, and may be employed independently or in combination; as long as ultimately, u=e and the creation process may be repeated.

The following examples are illustrative of creating an encryption key having e bits (e≧1) from a user key having u bits (u≧1):

REPLACEMENT

According to the present invention, in a replacement step, i bits ($1 \leq i \leq u$) of a user key starting from a position k ($1 \leq k \leq [u-i+1]$) may be replaced with j bits ($j \geq 1$, $j \neq i$) or i bits; preferably, with i bits. For example, replacing 2 bits (i=2) from a user key "011001" (u=6) starting from position 2 (k=2) with the bits "00" results in the user key "000001".

The value i may be based on a fixed value (e.g., replacing 1 bit at a time, 2 bits at a time, 3 bits at a time, etc.) or a variable value. A variable value may be generated from a formula integrated within program code (e.g., after each replacement, with i=1 initially, i=i+1, i=i+3, i=((i*13) MOD 8)+1, etc.). Alternatively, a variable value may be based on selecting from a set of predetermined values (e.g., i_set ≡{1,2,1,3,1,2,3,1, . . . }≡1 bit replaced, then 2 bits replaced, then 1 bit replaced, then 3 bits replaced, etc.) in any order that is repeatable or capable of repetition (e.g., sequential, reverse order, every other value, etc.).

In a preferred embodiment, i is based on the fixed value 8. Thus, replacing is preferably performed 8 bits at a time.

Position k may be based on a fixed value (e.g., always inserting at position k=1, k=2, . . . k=u+1) or a variable value. A variable value may be generated from a formula integrated within program code (e.g., after each replacement step, with k=1 initially; k=k+1, k=k+2, k=k+3, k=([k*13] MOD [u+1])+1), etc.). Alternatively, a variable value may be selected from a set of a plurality of predetermined values (e.g., k_set={1,2,1,3,1,2,3,1}≡in a first replacement step, i bits are replaced starting from position 1; in a second replacement step, i bits are replaced starting from position 2; in a third replacement step, i bits are replaced starting from position 1, etc.) in any sequence capable of repetition. Where a value k exceeds u−i+1, k may be reduced in value such that $1 \leq k \leq [u-i+1]$; for example, k=(k MOD [u−i+1])+1.

In a preferred embodiment, k is based on a variable value that is generated within program code. Specifically, the formula k=n*i+1 may be employed within a program loop, with n=0 initially and n=n+1 after each replacement.

The value of a bit or bits with which to replace during a replacement step may be based on a fixed value (e.g., always replacing with 0's; always replacing with 1's; if replacing 1 bit, replace with "0"; if replacing 2 bits, replace with "10"; if replacing 3 bits, replace with "111"; etc.). Alternatively, the value of a bit or bits with which to replace may be based on a variable value. A variable value may be based on a formula integrated within program code (e.g., after a replacement, incrementing the value of a bit or bits to be inserted by 1, with roll over); or based on selecting a value from a set of a plurality of predetermined values (e.g., v_set≡{1,1,0,0,0,1,0, . . . }≡in a first replacement step, if replacing 1 bit, replace with "1"; in a second replacement step, if replacing two bits, replace with "10"; in a third replacement step, if replacing 3 bits, replace with "001"; etc.) in any sequence capable of repetition. Where all the values contained in a set have been selected, selection may be restarted from the first value selected.

In a preferred embodiment, the values of bits with which to replace are based on selecting variable values from a set of a plurality of ASCII characters (e.g., V_set 300≡"FootBall") in any order capable of repetition. Preferably, values from v_set are selected starting from a position m, where m is based on a variable value selected from a set of a plurality of predetermined values, with a predetermined value m=n*i+1 for integers n≧0l, in sequential order, with the order restarting from the first value after the last value is selected. For example, such a set may be m_set≡{17,33,9,25,41,9,1,41,1,33}. It should be noted that where a value m would require a selection of bits from v_set beyond the maximum bit position in v_set, m may be first reduced in value (e.g., m=m−16) or selection may wrap-around to the first bit position in v_set.

FIG. 4a illustrates a preferred replacement embodiment according to the present invention, in which a user key 100 may be "Goose Gossage123" having a size of 128 bits; a v_set 300 of a plurality of predetermined values may be "FootBall"; an m_set 500 of a plurality of predetermined values may be {17,33,9,25,41,9,1,41,1,33}; i having a fixed value of 8; and k having a variable value of k=n*i+1, with n=0 initially and n=n+1 after each replacement.

As shown in FIG. 4b, in a first replacement step, n=0 initially, and i has a fixed value of 8. Next, a value of k is determined according to k=n*i+1, which is the value 1. Accordingly, 8 bits (i=8) may be deleted from user key 100 starting from position 1 ("G" is to be replaced), and replaced with a value from v_set 300. The first available value from m_set 500 is selected, which is the value 17. Accordingly, 8 bits (i=8) starting from position 17 of v_set may be selected (bits 17 through 24), which is the value "o". Thus, the value "G" of user key 100 may be replaced with the value "o", resulting in user key 100 having the value "ooose Gossage123". The value of n may be incremented by 1 (i.e., n=0+1=1).

As shown in FIG. 4c, in a second replacement step with n=1, i still has a fixed value of 8. Next, a value of k is determined according to k=n*i+1, which is the value 9. Accordingly, 8 bits (i=8) may be deleted from user key 100 starting from position 9 ("o" is to be replaced), and replaced with a value from v_set 300. The next available value from m_set 500 is selected, which is the value 33. Accordingly, 8 bits (i=8) starting from position 33 of v_set may be selected (bits 33 through 40), which is the value "B". Thus, the value "o" of user key 100 may be replaced with the value "B", resulting in user key 100 having the value "oBose Gossage123". The value of n may be incremented by 1 (i.e., n=1+1=2).

Preferably, replacement continues for 14 more iterations ([128÷i] iterations in toto). As can be seen, replacing i bits of a user key with i bits from another source does not change the value of u or e.

It should be noted that in any replacement step, any set of a plurality of predetermined values may be based on one or more values contained in a user key; however, this is not preferred.

INSERTION

According to the present invention, during an insertion step, one or more bits may be inserted into a user key at a position k ($1 \leq k \leq e$). In a preferred embodiment, in an insertion step, i bits ($i \geq 1$) may be inserted into a user key at position k ($1 \leq k \leq [u+1]$), with the bits before insertion at positions k through u, being shifted i places to the right after insertion, and u being increased by the value i. For example, inserting the bits "01" (i=2) into a user key "011001" (u=6) at position 3 (k=3) results in the user key "01011001" with u=u+2.

The value i may be based on a variable value (see below) or a fixed value (e.g., inserting 1 bit at a time, 2 bits at a time, . . . , 8 bits at a time). A variable value may be generated from a formula integrated within program code (e.g., after each insertion, with i=1 initially, i=i+1, i=i+3, i=((i*13) MOD 7)+1, etc.). Alternatively, and preferably, a variable number may be selected from a set containing a plurality of predetermined values (e.g., i_set≡{1,2,1,3,1, 2,3,1, . . . }≡in a first insertion, insert 1 bit; in a second insertion, insert 2 bits; in a third insertion, insert 1 bit; in a fourth insertion, insert 3 bits; etc.) in any sequence capable of repetition (e.g., sequential, reverse order, every other value, every 3 values, etc.). The insertion of a number of bits that would result in u>e should be avoided, as an additional step of removing at least one bit from the user key would be required. Thus, for example, where an insertion of i bits would result in u>e, i may be first reduced in value by the excess number of bits to be inserted (i.e., i=i−(i+u−e)) to avoid one or more additional steps of removing bits from a user key.

In a preferred embodiment, i is based on a variable value selected from a set containing a plurality of predetermined values, with a predetermined value=n*8, for integers $n \geq 1$ (e.g., i_set≡{8,16,8,32,24,8,8,32}≡in a first insertion, insert 8 bits; in a second insertion, insert 16 bits; in a third insertion, insert 8 bits; in a fourth insertion, insert 32 bits; etc.) in sequential order, with the order restarting from the first value after the last value is selected.

Position k may be based on a fixed value (e.g., always inserting at position k=1, k=2, . . . k=u+1) or a variable value. A variable value may be generated from a formula integrated within program code (e.g., after each insertion, with k=1 initially; k=k+1, k=k+3, k=([k*13]MOD[u+1])+1), etc.). Alternatively, and preferably, a variable value may be selected from a set of a plurality of predetermined values (e.g., k set {1,2,1,3,1,2,3,}≡i bits are inserted at position I in a first insertion step, then i bits are inserted at position 2 in a second insertion step, then i bits are inserted into position 1 in a third insertion step, etc.) in any sequence capable of repetition. Where a value k exceeds [u+1], k may be reduced in value such that $1 \leq k \leq [u+1]$; for example, k=(k MOD[u+1])+1.

In a preferred embodiment, k is based on a variable value selected from a set of a plurality of predetermined values, with a predetermined value=n*8+1 for integers $n \geq 0$, in sequential order, with the order restarting from the first value after the last value is selected. For example, such a set may be k_set≡{1,41,9,41,17,9,1,25,33,9}, which may result in individual insertions at positions 1, 41, 9, 41, etc. Where a selected value k is greater than u+1, k may be reduced by 8 until k=u+1.

The value of a bit or bits to be inserted during an insertion step may be based on a fixed value (e.g., always insert 0's; always insert 1's; if inserting 1 bit, insert "0"; if inserting 2 bits, insert "10"; if inserting 3 bits, insert "111"; etc.). Alternatively, the value of a bit or bits to be inserted may be based on a variable value. A variable value may be based on a formula integrated within program code (e.g., after an insertion, incrementing the value of a bit or bits to be inserted by 1, with roll over); or based on selecting a value from a set of a plurality of predetermined values (e.g., v_set≡{1,0,0,0,1,0, . . . }≡in a first insertion step, if inserting 1 bit, insert "1"; in a second insertion step, if inserting two bits, insert "10"; in a third insertion step, if inserting 3 bits, insert "001"; etc.) in any sequence capable of repetition. It should be noted that the set of a plurality of predetermined values may be based on one or more values contained in a user key; however, this is not preferred.

In a preferred embodiment, the values of bits to be inserted are based on selecting a value from a set of a plurality of ASCII characters in sequential order, with the order restarting from the first value after the last value is selected. As noted above, in a preferred embodiment inserting bits into a user key, i is based on a variable value selected from a set containing a plurality of predetermined values, with a predetermined value=n*8+1, for integers n>0; and k is based on a variable value selected from a set of a plurality of predetermined values, with each predetermined value= n*8+1, for integers n.

Thus, FIG. 5*a*, shows a preferred embodiment of the present invention prior to an insertion of one or more bits into a user key 100 having u bits to create an encryption key having e bits, in which a user key 100 may be "Goose Gossage" such that u=104; an i_set 200 of a plurality of predetermined values may be "8,16,8,32,24,8,8,32"; a v_set 300 of a plurality of predetermined values may be "Foot-Ball"; and a k_set 400 of a plurality of predetermined values may be "1,41,9,41,17,9,1,25,3 3,9".

As shown in FIG. 5*b*, in a first insertion, i is selected from the first available value contained in i_set 200, which is the value "8". Accordingly, 8 bits are selected starting from the first available value in v_set 300, which is the ASCII character "F". Next, the first available value from k_set 400 is selected, which is the value "1". Accordingly, the 8 bit character "F" is inserted into position 1 of user key 100, resulting in the value "Goose Gossage" and u=112.

As shown in FIG. 5*c*, in a second insertion, i is selected from the next available value contained in i_set 200, which is the value "16". Accordingly, 16 bits are selected from the next available value in v_set 300, which are the ASCII characters "oo". Next, the next available value from k_set 400 is selected, which is the value "41". Accordingly, the characters "oo" are inserted into position 41 of user key 100, resulting in the value "FGoosooe Gossage" such that u=128. Since after a second insertion u=e, the creation may stop.

DELETION

According to the present invention, during a deletion step, one or more bits may be deleted from a user key starting from a position k (1≦k≦u). In a preferred embodiment, in a deletion step, i bits (1≦i≦u) may be deleted from a user key at position k (1≦k≦[u−i+1]), with the bits after deletion at positions k+i through u, being shifted i places to the left, and u being decreased by the value i. For example, deleting 2 bits (i=2) from a user key "011001" (u=6) starting from position 2 (k=2) may result in the user key "0001" with u=u−2.

The value i may be based on a variable value (see below) or a fixed value (e.g., deleting 1 bit at a time, 2 bits at a time, . . . , 8 bits at a time, u−e bits ). A variable value may be generated from a formula integrated within program code (e.g., after each deletion, with i=1 initially, i=i+1, i=i+3, i ((i*13)MOD 7), etc.). Alternatively, and preferably, a variable number may be selected from a set containing a plurality of predetermined values (e.g., i_set≡{1,2,1,3,1, 2,3,1, . . . }≡in a first deletion, delete 1 bit; in a second deletion, delete 2 bits; in a third deletion, delete 1 bit; in a fourth deletion, delete 3 bits; etc.) in any sequence capable of repetition (e.g., sequential, reverse order, every other value, every 3 values, etc.). The deletion of a number of bits that would result in u<e should be avoided, as an additional step of inserting at least one bit to the user key would be required. Thus, for example, where a deletion of i bits would result in u<e, i may be first reduced in value by the excess number of bits; i.e., i=i−(e−[u−i]) to avoid one or more additional steps of inserting bits into a user key.

In a preferred embodiment, i is based on a variable value selected from a set containing a plurality of predetermined values, with a predetermined value=n*8, for integers n>1 (e.g., i_set≡{8,16,8,32,24,8,8,32}≡in a first deletion, delete 8 bits; in a second deletion, delete 16 bits; in a third deletion, delete 8 bits; in a fourth deletion, delete 32 bits; etc.) in sequential order, with the selection restarting from the first value after the last value is selected.

Position k may be based on a fixed value (e.g., always deleting from position k=1, k=2, . . . , k=u−i+1) or a variable value. A variable value may be generated from a formula integrated within program code (e.g., after each deletion step, with k=1 initially; k=k+1, k=k+2; k=k+3, k=([k*13] MOD[u+1])+1), etc.). Alternatively, and preferably, a variable value may be selected from a set of a plurality of predetermined values (e.g., k_set≡{1,2,1,3,1,2,3,1}≡i bits are deleted starting from position 1 in a first deletion step, then i bits are deleted starting from position 2 in a second deletion step, then i bits are deleted starting from position 1 in a third deletion step, etc.) in any sequence capable of repetition. Where a value k exceeds [u−i+1], k may be reduced in value such that 1≦k≦[u−i+1] (e.g., k=(k MOD [u−i+1])+1).

In a preferred embodiment, k is based on a variable value selected from a set of a plurality of predetermined values, with a predetermined value=n*8+1 for integers n≧0, in sequential order, with the order restarting from the first value after the last value is selected. For example, such a set may be k_set≡{1,41,9,41,17,9,1,25,33,9}, which may result in individual deletions starting from positions 1, 41, 9, 41, etc.

As noted above, in a preferred embodiment deleting bits from a user key, i is based on a variable value selected from a set containing a plurality of predetermined values, with a predetermined value=n*8, for integers n≧1; and k is based on a variable value selected from a set of a plurality of predetermined values, with a predetermined value n*8+1, for integers n≧0.

FIG. 6a, shows a preferred embodiment of the present invention prior to deletion of one or more bits from a user key 100 having u bits to create an encryption key having e bits, in which a user key 100 may be "Goose Gossage is Here" such that u=168; an i_set 200 of a plurality of predetermined values may be "8,16,8,32,24,8,8,32"; and a k_set 400 of a plurality of predetermined values may be "1,41,9,41,17,9,1,25,33,9".

As shown in FIG. 6b, in a first deletion step, i is selected from the first available value contained in i_set 200, which is the value "8". Next, the first available value from k_set 400 is selected, which is the value "1". Accordingly, 8 bits are deleted from user key 100 starting from the position 1, resulting in the value "oose Gossage is Here" and u=160.

As shown in FIG. 6c, in a second deletion, i is selected from the next available value contained in i_set 200, which is the value "16". Next, the next available value from k_set 400 is selected, which is the value "41". Accordingly, 16 bits are deleted from user key 100 starting from the position 41, resulting in the value "oose ssage is Here" such that u=144.

As shown in FIG. 6d, in a third deletion, i is selected from the next available value contained in i_set 200, which is the value "8". Next, the next available value from k_set 400 is selected, which is the value "9". Accordingly, 8 bits are deleted from user key 100 starting from the position 9, resulting in the value "ose ssage is Here" such that u=136.

As shown in FIG. 6e, in a fourth deletion, i is selected from the next available value contained in i_set 200, which is the value "32". Since deleting 32 bits from user key 100 would result in u<e (i.e., 104<128), i is reduced in value by the excess number of bits; via i=i−(e−[u−i]), resulting in i=8. Next, the next available value from k_set 400 is selected, which is the value "41". Accordingly, 8 bits are deleted from user key 100 starting from the position 41, resulting in the value "ose sage is Here" such that u=128. Since after a fourth insertion u=e, the creation may stop.

REARRANGEMENT

As noted above, according to the present invention, one or more rearrangement steps may optionally be employed in creating an encryption key from a user key.

According to the present invention, in a rearrangement step, one or more bits of a user key may be deleted from a user key starting from position k and inserted into the user key starting from position m.

In a preferred embodiment, in a rearrangement step, i bits (1≧i≧u) may be deleted from a user key starting from position k (1≧k≧[u−i+1]), with the bits after deletion at positions k+i through u, being shifted i places to the left after insertion, and u being decreased by the value i. For example, deleting 2 bits (i=2) from a user key "011001" (u=6) starting from position 2 (k=2) may result in the user key "0001" with u u−2. Next, the one or more deleted bits may be inserted into the user key starting from position m (1≦m≦[u+1]), with the bits before insertion from positions k through k+i being shifted i places to the right, and u being increased in value by i. For example, inserting 2 bits (i=2) into a user key "0001" (u=6) starting from position 5 (m=5) may result in the user key "000111" with u=u+2.

The value i may be based on a variable value (see below) or a fixed value (e.g., rearranging 1 bit at a time, 2 bits at a time, . . . , 8 bits at a time, u−1 bits). A variable value may be generated from a formula integrated within program code (e.g., after each rearrangement, with i=1 initially, i=i+1, i=i+3, i=((i*13)MOD 7), etc.). Alternatively, and preferably, a variable number may be selected from a set containing a plurality of predetermined values (e.g., i_set≡{1,2,1,3,1, 2,3,1, . . . }≡in a first rearrangement, switch 1 bit with 1 bit; in a second rearrangement, switch 2 bits with 2 bits; in a third rearrangement, switch 1 bit with 1 bit; in a fourth rearrangement, switch 3 bits with 3 bits; etc.) in any sequence capable of repetition (e.g., sequential, reverse order, every other value, every 3 values, etc.).

In a preferred embodiment, i is based on a variable value selected from a set containing a plurality of predetermined values, with a predetermined value=n*8, for integers n≧1 (e.g., i_set≡{8,16,8,32,24,8,8,32}≡in a first replacement, replace 8 bits with 8 bits; in a second replacement, replace 16 bits with 16 bits; in a third replacement, replace 8 bits with 8 bits; in a fourth replacement, replace 32 bits with 32 bits; etc.) in sequential order, with the selection restarting from the first value after the last value is selected.

Position k may be based on a fixed value (e.g., always replacing from position k=1, k=2, . . . , or k=u−i+1) or a variable value. A variable value may be generated from a formula integrated within program code (e.g., after each rearrangement step, with k=1 initially; k=k+1, k=k+2; k=k+3, k=([k*13]MOD[u−i+1])+1), etc.). Alternatively, and preferably, a variable value may be selected from a set of a plurality of predetermined values (e.g., k_set≡{1,2,1,3,1, 2,3,1}≡in a first rearrangement step, i bits starting from position 1 are rearranged with i bits starting from position m; in a second rearrangement step, i bits starting from position 2 are rearranged with i bits starting from position m; in a third rearrangement step, i bits starting from position 1 are rearranged with i bits starting from position m; etc.) in any sequence capable of repetition. Where a value k exceeds [u−i+1], k may be reduced in value such that 1≦k≦[u−i+1] (e.g., k=(k MOD[u−i+1])+1).

In a preferred embodiment, k is based on a variable value selected from a set of a plurality of predetermined values, with a predetermined value=n*8+1 for integers n≧0, in sequential order, with the order restarting from the first value after the last value is selected. For example, such a set may be k_set≡{1,41,9,41,17,9,1,25,33,9}, which may result in individual rearrangement steps starting from positions 1, 41, 9, 41, etc.

In a rearrangement step, m may be based on a fixed value or a variable value, to the same extent as k. It should be noted that while k and m may be selected from the same set of a plurality of predetermined values, preferably they are selected from different sets.

In a preferred embodiment, m is based on a variable value selected from a set of a plurality of predetermined values, with a predetermined value=n*8+1 for integers n≧0, in sequential order, with the order restarting from the first value after the last value is selected. For example, such a set may be m-set≡{17,33,9,25,41,9,1,41,1,33}, which may result in individual rearrangement steps starting from positions 17, 33, 9, 25, etc.

As noted above, in a preferred embodiment of rearranging bits in a user key, i is based on a variable value selected from a set containing a plurality of predetermined values, with a predetermined value=n*8, for integers n≧1; k is based on a variable value selected from a set of a plurality of predetermined values, with a predetermined value=n*8+1, for integers n≧0; and m is based on a variable value selected from a set of a plurality of predetermined values, with a predetermined value=n*8+1, for integers n≧0.

FIG. 7a shows a preferred embodiment of rearrangement according to the present invention prior to rearrangement of one or more bits in a user key 100; in which a user key 100 may be "Goose Gossage123", with u=128; an i_set 200 of a plurality of predetermined values may be "8,16,8,32,24, 8,8,32"; a k_set 400 of a plurality of predetermined values may be "1,41,9,41,17,9,1,25,33,9"; and an m_set 500 of a plurality of predetermined values may be "17,33,9,25,41,9, 1,41,1,33".

As shown in FIG. 7b, in a first rearrangement step, i is selected from the first available value contained in i_set 200, which is the value "8". Next, the first available value from k_set 300 is selected, which is the value "1". Accordingly, 8 bits may be deleted from user key 100 starting from position 1 ("G" is deleted), resulting in user key 100 having the value "oose Gossage123" and u=120. Next, the first available value from m_set 500 is selected, which is the value "17". Accordingly, "G" may be inserted into user key 100 starting from position 17, resulting in user key 100 having the value "ooGse Gossage123" and u=128.

As shown in FIG. 7c, in a second rearrangement step, i is selected from the next available value contained in i_set 200, which is the value "16". Next, the next available value from k_set 300 is selected, which is the value "41". Accordingly, 16 bits may be deleted from user key 100 starting from position 41 ("G" is deleted), resulting in user key 100 having the value "ooGseossage123" and u=112. Next, the next available value from m_set 500 is selected, which is the value "33". Accordingly, "G" may be inserted into user key 100 starting from position 33, resulting in user key 100 having the value "ooGs Geossage123" and u=128.

Rearrangement, as shown, may continues for as many iterations as desired. As noted, rearrangement is optional. As can be seen, replacing i bits of a user key with i bits from another source does not change the value of u or e.

SEEDING

According to the present invention, seeding may be optionally employed, and when employed, is part of the cryptography software. A seed may be combined with private data prior to encryption according to a particular format (e.g., intermixed symmetrically or asymmetrically with the private data, appended to the head or tail of the private data, etc.). After decryption of encrypted private data that was seeded, the seed may be extracted and compared to its known value. Where the extracted value (potential seed) deviates from the known seed value, a server may know that either the encryption was unsuccessful or the encrypted private data was not encrypted by the server.

A seed may be one or more bits. Preferably, a seed is 40 bits in length.

The value of a seed may be predetermined (e.g., "Beer!") or generated based on one or more bits in the private data (e.g., checksum, parity, etc.). Preferably however, a seed has a predetermined value.

FIG. 8 illustrates a preferred seeding technique according to the present invention. As shown in FIG. 8, a seed 60 may have the value "Beer!" and private data 50 may have the value "Gossage". As shown in FIG. 8b, seed 60 may be concatenated to the head of private data 50 resulting in modified private data 50 "Beer!Gossage". Thus, as seeded, private data 50 may be encrypted. Upon decryption, 40 bits may be extracted from the head of private data 50 and compared to determine whether it is seed 60.

The present invention is now described in operation:

As shown in FIG. 2a, a user's computer may contact a server according to the present invention by sending a request for data, which contains private data 50, via the user's computer 30.j over the Internet 20 to a server 10.i. After receiving the private data 50, a server 10.i causes the data 50 to be stored in a memory 11.i (preferably RAM) for subsequent encryption. The user may contact a server by entering the URL or Internet address of the server or by clicking or selecting a bookmark or hyperlink directed to the server. Subsequently, the user may continue to enter private data 50 relating to the user, which may include any private data as previously defined. As shown in FIG. 2b, this is preferably performed by a user filling out a form, via keyboard entry, displayed on a display device 70 via browser software. Referring again to FIG. 2b, a form may contain a name field 71 and an email field 72 for inputting of a name and an email address, respectively; and further, a form may contain a submit button 74 for submission of a completed form. Upon submission of the form, the data may be posted to a CGI Program or script or similar program or script located on the server via transmission over the Internet to the server.

It should be noted that the clicking history of a user, as that user peruses web pages, banners and/or links may also be considered private data. Thus, the submission of data may occur over one or more transactions and need not be limited to submitted form data.

The private data sent by the user, in whole or in part, represents a state between the user and the server and thereby dictates in whole or in part the private data to be stored in a cookie by the server. For example, a user may send his last name, which may be "Gossage". Preferably, as shown in FIG. 2a, the private data 50 may be transferred between the user's computer 30.j and server 10.i via a secured connection 15, such as SSL.

It should be noted that some precoding and decoding may be required with the particular encryption algorithm employed. For example, the private data may be concatenated in a particular order to form a string having fixed or variable length fields. Another form of coding is binary/text conversion, and may arise, for example, where a particular encryption algorithm/technique requires input data in binary format and the input data is initially in text format; and may also be optionally employed after output. Any binary/text conversion and/or coding may be optionally employed prior to input, as well as subsequent to output, as long as one-to-one correspondence between the precoded and decoded data is preserved.

Figure 3:
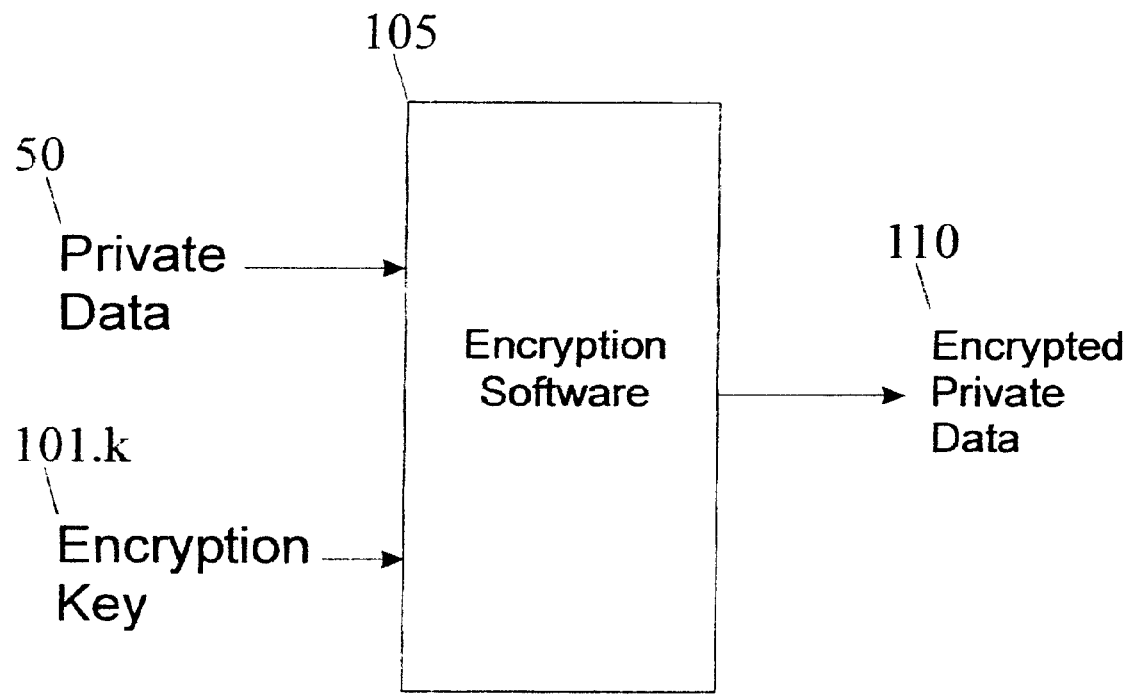
FIG. 3 shows the inputting of private data and an encryption key into an encryption function to produce encrypted private data.

As shown in FIG. 3, encryption of private data 50 is effectuated by inputting the private data 50 and an encryption key 101.k (for k≧1) into encryption function 100, which produces encrypted private data 110. It should be noted that the format of the particular key used will be dictated by the particular cryptography algorithm employed. For example, the PUKALL algorithm is designed to accept 16-character strings as keys.

According to a preferred embodiment, the PUKALL encryption algorithm accepts a 16-character string as a 256-bit key, such as the 16-character string "Remsaalps!123456". Encrypting the value "Gossage" with this key via the PUKALL algorithm may produce the value "¾M}7¿□c÷□".

There are six parameters that may be assigned to a cookie: (1) the name of the cookie, (2) the value of the cookie, (3) the expiration date of the cookie, (4) the path the cookie is valid for, (5) the domain the cookie is valid for, and (6) a flag representing the need for a secure connection to exist to use the cookie.

According to the present invention, the first two parameters must be explicitly assigned values: (1) the name of the cookie, and (2) the value of the cookie. The next four parameters may be optionally explicitly assigned values: (3) the expiration date of the cookie, (4) the path the cookie is valid for, (5) the domain the cookie is valid for, and (6) a flag representing the need for a secure connection to exist to use the cookie. These optional parameters may be explicitly assigned values to improve security and/or functionality, and are discussed in further detail herein.

Generally, creating a cookie involves replicating the HTTP cookie header in some fashion so that browser software executing on a remote computer will recognize and store the cookie.

According to the present invention, name data is assigned to the name field of a cookie, such as the name "ywi". Further, the encrypted private data with the embedded key is assigned to the value field of a cookie.

The optional parameter (3), the expiration date of the cookie, may be assigned to the expires field of a cookie to direct browser software executing on a remote computer whether to store the cookie on a storage device, e.g., a hard drive. If not explicitly assigned a value, the expires field defaults to end-of-session and the browser preserves the cookie only in memory (RAM) until the browser session is closed. Such a value may be a past date, or a future date such as "Mon, 09-Dec-2002 13:46:00 GMT", which if processed prior to expiration, may be stored in a storage device. A resulting HTTP header representing this cookie may be as follows:

Content-type: text/html
Set-Cookie: ywi="¾M}7¿□c÷□"; path=/;
  expires=Mon, 09-Dec-2002 13:46:00 GMT Upon receiving this header, browser software executing on a remote computer may store the cookie to a storage device.

The optional parameter (4), the path the cookie is valid for, may be explicitly assigned a value, such as "/computerstore". This causes to be set the URL path the cookie is valid within. Thus, pages outside the path "/computerstore" cannot read or use the cookie having this value. Explicitly assigning a value to this parameter would be advantageous where multiple websites exist within a domain, such as www.thissite.com and www.thissite.com/otherparty, and sharing of cookies between the servers associated therewith is undesired. If not specified, the value defaults to the path of the document creating the cookie.

The optional parameter (5), the domain the cookie is valid for, may be explicitly assigned a value, such as ".thissite.com". Where a website uses multiple servers within a domain, it may be desirable to make the cookie accessible to pages on any of those servers. Thus, a cookie may be assigned to an individual server or to an entire Internet domain. Here, all servers within the domain www.thissite.com may access the cookie so defined. The default value if not explicitly set is the full domain of the document creating the cookie.

The optional parameter (6), a flag representing the need for a secure connection to exist to use the cookie, should only be used under a secure sever condition, such as SSL. Where secure transactions are implemented, this parameter heightens security between a server and a remote computer. If not explicitly set to TRUE, this defaults to FALSE.

In sending the cookie to a remote computer, the server effectuates the creation of an HTTP header which is sent along with a requested page. This causes the value of the cookie to be sent to a remote computer, received thereby, and in conjunction with browser software executing thereon, stored in memory or on a storage device, such as a hard drive.

Figure 9:
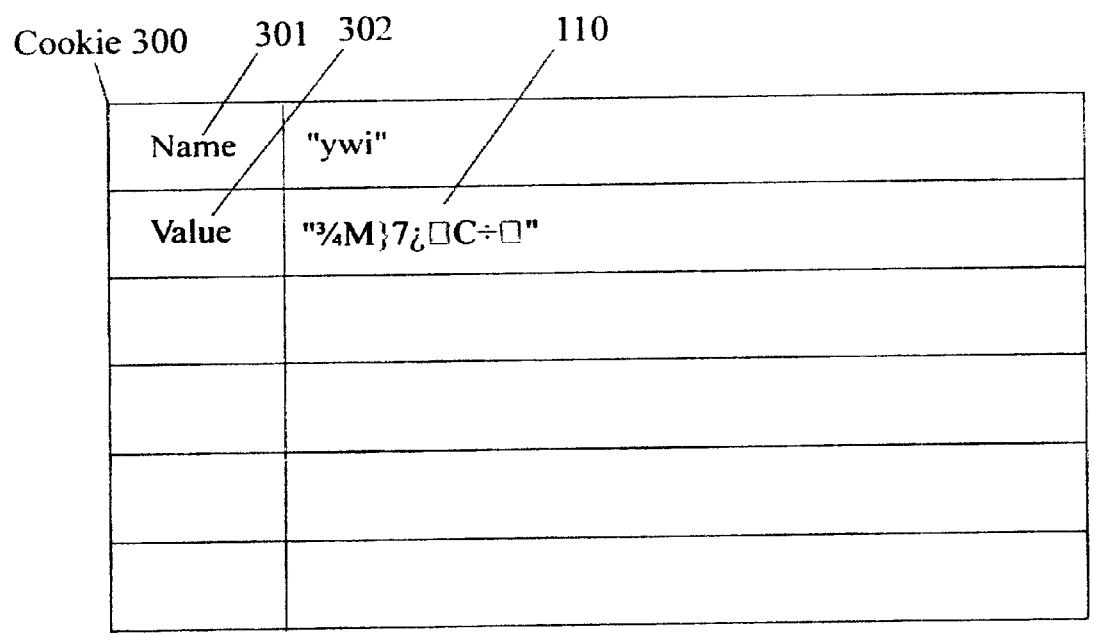
FIG. 9 shows a cookie containing encrypted private data.

As shown in FIG. 9, according to the present invention, a cookie 300 has at a minimum a name field 301 with a value representing the name of the cookie, such as "ywi". Further, the cookie 300 has a value field 302 containing the encrypted private data 110, which may be "¾M}7¿□c÷□".

It is important to note that cookies, as they are implemented today, are transferred between a server and a browser as an HTTP header and the specifications for this header are explicitly set forth in RFC 2109, which has been readily and freely available over the Internet. Further, the setting and reading of cookies can be effectuated with a plurality of languages and/or scripts, and the particular choice of language and/or script is not important to the present invention insofar as it does not deviate from the teachings of the invention. Examples of languages and scripts are as follows: JavaScript, PERL, LiveWire, ASP, Virtual Basic ("VB") and VBScript. Further, custom software may be used, via C, C++, etc., to the extent that a compatible HTTP header is created.

Figure 10A:
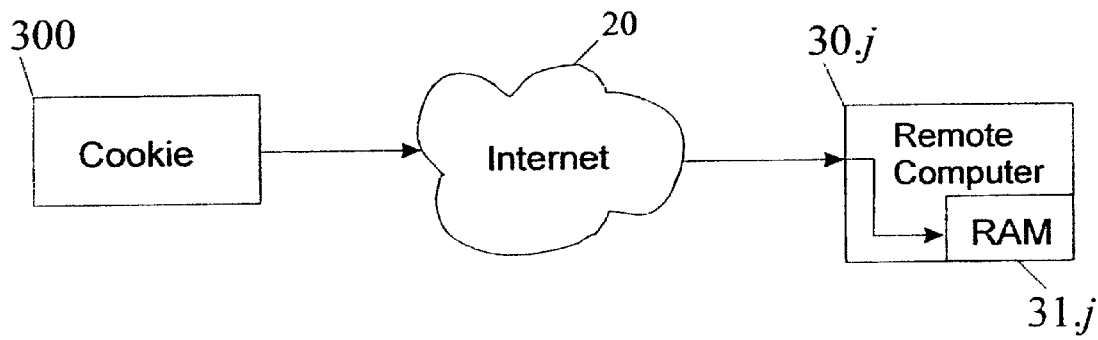
FIG. 10a shows a non-persistent cookie sent over the Internet to a remote computer that stores it in the remote computer's RAM.
Figure 10B:
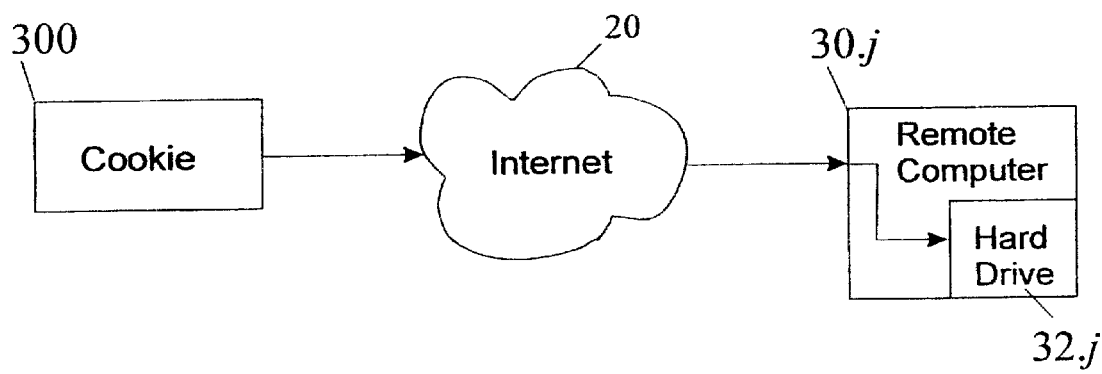
FIG. 10b shows a persistent cookie sent over the Internet to a remote computer that stores it in a hard drive.

As shown in FIGS. 10a and 10b, a cookie 300 is sent over the Internet 20 to a user's remote computer 30.j, which stores the cookie 300 in a read-write device, which may be the remote computer's RAM 31.j or storage device, such as a hard drive 32.j.

When a user subsequently requests a page from the server or a related server, i.e., a request from the browser to a server, the cookie header is modified slightly from that which created the cookie. For example, the header may be as follows:

Content-type: text/html
Set-Cookie: ywi="¾M}7¿□c÷□"

Here, a server is made aware of the cookie named "ywi" having the value of the encrypted private data with embedded key. Generally, retrieving a cookie from a header does not require actual reading of the HTTP Cookie: header, since most languages automatically read this header for the programmer and make it accessible through a programming variable or object. As with creating a cookie, accessing a cookie may be effectuated with a plurality of languages and/or scripts, and the particular choice of language and/or script is not important to the present invention insofar as it does not deviate from the teachings of the present invention. Examples of languages and scripts are discussed above.

Figure 11A:
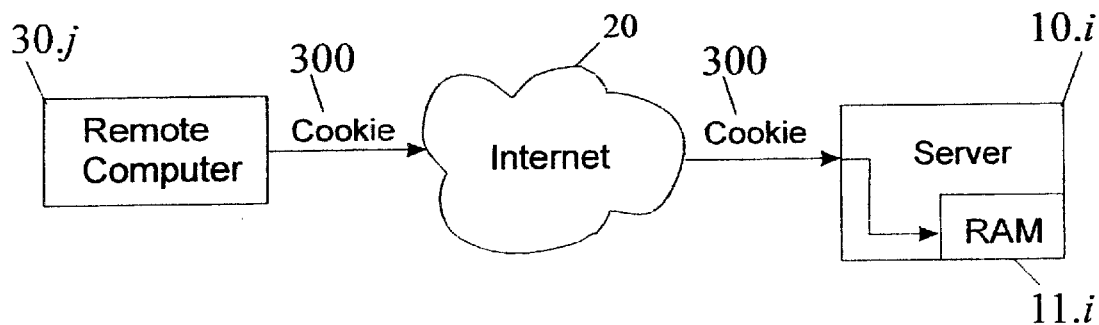
FIG. 11a shows a remote computer sending a cookie over the Internet to a first server.

As shown in FIG. 11a, a user's remote computer 30.j may send a cookie 300 back to server 10.i that originally sent the cookie 30.j to the user's computer 30.j for storage of the cookie 30.j in server memory 11.i for subsequent processing.

Figure 11B:
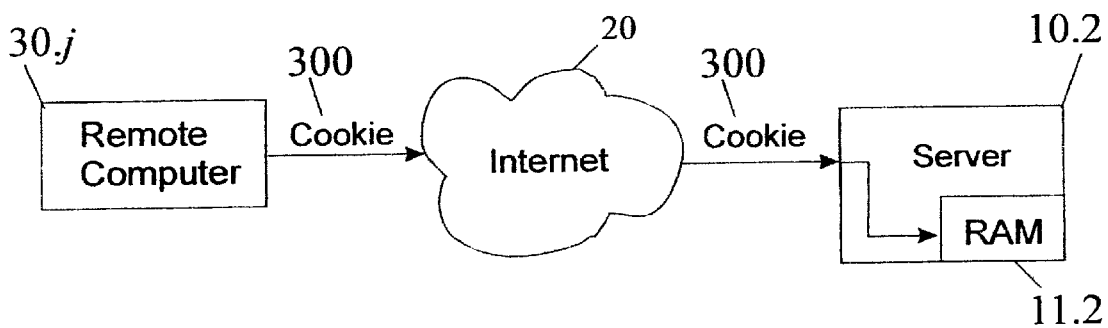
FIG. 11b shows a remote computer sending a cookie over the Internet to a second server.

As shown in FIG. 11b, a user's remote computer 30.j may send a cookie 300 to a server 10.2, which is not the server that originally sent the cookie 300 to the user's computer 30.j. As also shown FIG. 6b, server 10.2 stores cookie 30.j in server memory 11.2 for subsequent processing.

Once the value of the cookie is accessed by a server, the encrypted private data may be extracted from the data field of the cookie.

Figure 2C:
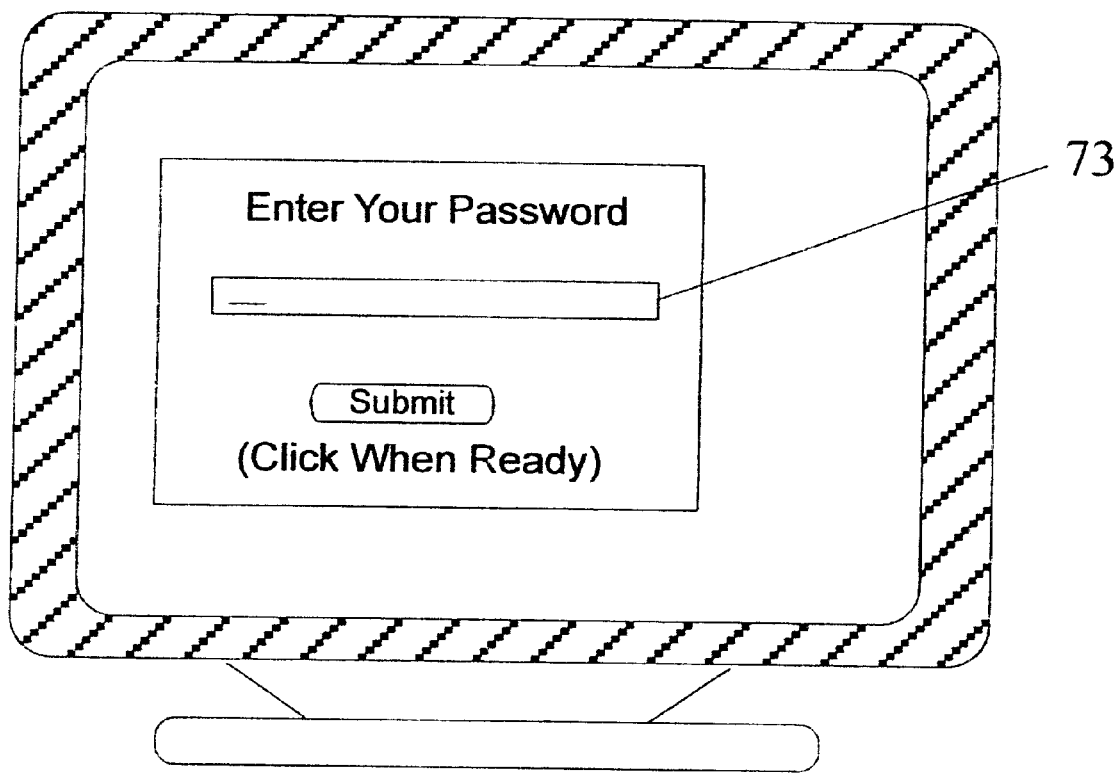
FIG. 2c shows a form containing a field for inputting of a user key.

As shown in FIG. 2c, a user may again be presented with a form having a user key data field 73 for inputting and submission to a server of the user's associated user key, which is required for recreation of the user's associated encryption key.

Figure 12:
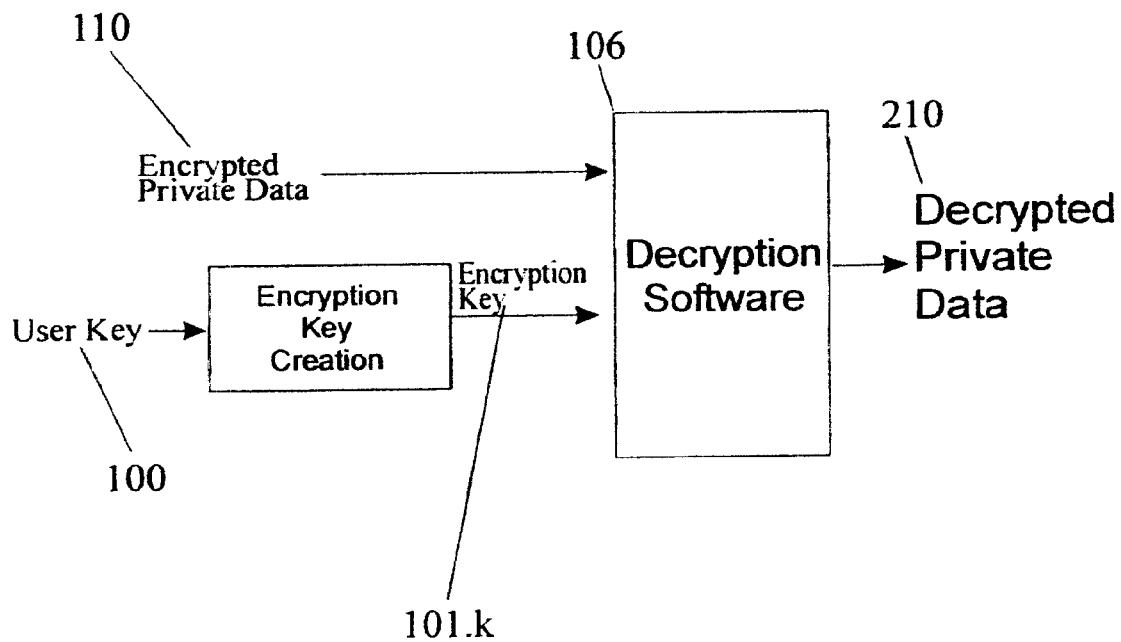
FIG. 12 shows the decryption of encrypted private data with a user key.

As shown in FIG. 12, upon submission of the correct user key, a server may then recreate the encryption key 101.k used to encrypt the private data according to the same creation process used to create the encryption key initially. Referring again to FIG. 12, a server may then decrypt encrypted private data 110 by inputting encrypted private data 110 and the recreated encryption key 101.k into decryption software 106, which results in decrypted private data 210.

With this decrypted private data, a state may be created between the server and the remote computer of a user. For example, the decrypted data may be the user's last name, such as "Gossage" wherein the server may now know the identity of the user; thus creating a state between the server and the user.

As can be seen, the present invention efficiently protects the privacy of Internet users by protecting private user data available for establishing Internet user states.

In the foregoing specification, the invention has been described with reference to specific exemplary embodiments thereof. It will, however, be evident that various modifications and/or changes may be made thereto without departing from the broader spirit and scope of the invention. For example, where the size of a user key, as submitted by a user, is equal to the size required of an encryption key, the user key may be used directly as an encryption key. Accordingly, the specification and drawings are to be regarded in an illustrative and enabling rather than a restrictive sense.

Therefore, I claim:

1. A method for creating secure Internet user states between one or more servers and one or more Internet users, a server comprising an operable Internet connection, a server memory, server software, cryptography software, and a CPU for executing said server software and said cryptography software, wherein said server CPU, said server memory and said server Internet connection are operatively connected to each other by at least one bus, associated with each of said one or more users, a remote computer comprising an operable Internet connection, Internet software, one or more computer memories, one or more input devices and a CPU for executing said Internet software, wherein said computer Internet connection, each of said one or more computer memories, each of said one or more input devices and said computer CPU are operatively connected to each other by at least one bus, said method comprising the steps of:

a) sending by a user initial private data relating to said user over the Internet to a first server by one or more user inputs via one or more of said input devices connected to a remote computer of said user;

b) receiving said initial private data from the Internet by said first server, said first server storing said initial private data in said first server memory;

c) sending by said user a user key associated with said user over the Internet to said first server by one or more user inputs via one or more of said input devices, said user key having a size of U bits, where U>0;

d) receiving said user key from the Internet by said first server, said first server storing said user key in said first server memory;

e) creating by said first server an encryption key having a size of E bits from said user key, wherein said step of creating comprises inserting one or more bits into said user key at a position K of said user key, where $1 \geq K \geq U+1$ and E>0;

f) encrypting said initial private data by said first server by input of said initial private data and said encryption key into said cryptography software, the output of said cryptography software being encrypted private data;
g) assigning by said first server said encrypted private data to the value field of a cookie and a name to the name field of said cookie;
h) sending by said first server said cookie over the Internet to said remote computer;
i) receiving by said remote computer said cookie from the Internet, wherein said remote computer stores said cookie in a first computer memory;
j) sending by said remote computer said cookie over the Internet to said first server;
k) receiving by said first server said cookie from the Internet, wherein said first server extracts said encrypted private data from said cookie and stores said encrypted private data in said first server memory;
l) resending by said user said user key over the Internet to said first server;
m) receiving said user key from the Internet by said first server, said first server storing said user key in said first server memory;
n) recreating by said first server said encryption key from said user key, wherein said step of recreating comprises inserting said one or more bits into said user key at said position K of said user key;
o) decrypting said encrypted private data by said first server by input of said encrypted private data and said encryption key into said cryptography software, the output of said cryptography software being said initial private data; and
p) establishing a state between said first server and said user by said first server based on said initial private data.

2. The method of claim 1, said method further comprising the steps of:
q) before step f), modifying said initial private data by said first server by inserting a seed into said initial private data according to a particular format;
r) after step o) and before step p), determining by said first server if said seed is contained in said initial private data according to said particular format; and
s) if said seed is not contained in said decrypted private data according to said particular format, sending an error message to said remote computer by said first server and skipping step p).

3. The method of claim 1, wherein an input device of a remote computer is a pointing device.

4. The method of claim 1, wherein an input device of a remote computer is a keyboard.

5. The method of claim 1, wherein a first input device of said remote computer is a keyboard and a second input device of said remote computer is a pointing device.

6. The method of claim 1, wherein said Internet software of a remote computer is Internet browser software.

7. The method of claim 1, wherein said first server and said remote computer communicate, in whole or in part, over a secure connection.

8. The method of claim 1, wherein the size of said user key in bits is evenly divisible by the value 8.

9. The method of claim 1, wherein the size of said encryption key in bits is evenly divisible by the value 8.

10. The method of claim 1, wherein E>U.

11. The method of claim 1, wherein E=U.

12. The method of claim 1, wherein E<U.

13. The method of claim 1, where in step g), said first server additionally assigns an expiration date to the expires field of said cookie.

14. The method of claim 1, where in step g), said first server additionally assigns its base domain value to the domain field of said cookie.

15. The method of claim 1, where in step g), said first server additionally assigns the value TRUE to the secure flag field of said cookie; and the sending and receiving of said cookie between said first server and said remote computer are over a secure connection.

16. The method of claim 1, said method further comprising the steps of:
t) sending by said remote computer said cookie over the Internet to a second server, wherein said second server is within the domain set of said domain value of said cookie;
u) receiving by said second server said cookie from the Internet, wherein said second server extracts said encrypted private data from said cookie and stores said encrypted private data in said second server memory;
v) sending by said user said user key over the Internet to said second server;
w) receiving said user key from the Internet by said second server, said second server storing said user key in said second server memory;
x) recreating by said second server said encryption key from said user key, wherein said step of recreating comprises inserting said one or more bits into said user key at said position K of said user key;
y) decrypting said encrypted private data by said second server by input of said encrypted private data and said encryption key into said cryptography software, the output of said cryptography software being said initial private data; and
z) establishing a state between said second server and said user by said second server based on said initial private data.

17. The method of claim 16, said method further comprising the steps of:
aa) before step f), modifying said initial private data by said first server by inserting a seed into said initial private data according to a particular format;
ab) after step y) and before step z), determining by said second server if said seed is contained in said initial private data according to said particular format; and
ac) if said seed is not contained in said initial private data according to said particular format, sending an error message by said second server to said remote computer and skipping step z).

18. A method for creating secure Internet user states between one or more servers and one or more Internet users, a server comprising an operable Internet connection, a server memory, server software, cryptography software, and a CPU for executing said server software and said cryptography software, wherein said server CPU, said server memory and said server Internet connection are operatively connected to each other by at least one bus, associated with each of said one or more users, a remote computer comprising an operable Internet connection, Internet software, one or more computer memories, one or more input devices and a CPU for executing said Internet software, wherein said computer Internet connection, each of said one or more computer memories, each of said one or more input devices and said computer CPU are operatively connected to each other by at least one bus, said method comprising the steps of:
a) sending by a user initial private data relating to said user over the Internet to a first server by one or more user inputs via one or more of said input devices connected to a remote computer of said user;

b) receiving said initial private data from the Internet by said first server, said first server storing said initial private data in said first server memory;

c) sending by said user a user key associated with said user over the Internet to said first server by one or more user inputs via one or more of said input devices, said user key having a size of U bits, where (U>0);

d) receiving said user key from the Internet by said first server, said first server storing said user key in said first server memory;

e) creating by said first server an encryption key having a size of E bits from said user key, wherein said step of creating comprises deleting I bits from said user key from a position K of said user key, where ($1 \geq I > U$), ($1 \geq K \geq [U-I+1]$) and (E>0);

f) encrypting said initial private data by said first server by input of said initial private data and said encryption key into said cryptography software, the output of said cryptography software being encrypted private data;

g) assigning by said first server said encrypted private data to the value field of a cookie and a name to the name field of said cookie;

h) sending by said first server said cookie over the Internet to said remote computer;

i) receiving by said remote computer said cookie from the Internet, wherein said remote computer stores said cookie in a first computer memory;

j) sending by said remote computer said cookie over the Internet to said first server;

k) receiving by said first server said cookie from the Internet, wherein said first server extracts said encrypted private data from said cookie and stores said encrypted private data in said first server memory;

l) resending by said user said user key over the Internet to said first server;

m) receiving said user key from the Internet by said first server, said first server storing said user key in said first server memory;

n) recreating by said first server said encryption key from said user key, wherein said step of recreating comprises deleting I bits from said user key at said position K of said user key;

o) decrypting said encrypted private data by said first server by input of said encrypted private data and said encryption key into said cryptography software, the output of said cryptography software being said initial private data; and p) establishing a state between said first server and said user by said first server based on said initial private data.

19. The method of claim 18, said method furter comprising the steps of:

q) before step f), modifiing said initial private data by said first server by inserting a seed into said initial private data according to a particular format;

r) after step o) and before step p), determining by said first server if said seed is contained in said initial private data according to said particular format; and s) if said seed is not contained in said decrypted private data according to said particular format, sending an error message to said remote computer by said first server and skipping step p).

20. The method of claim 18, wherein an input device of a remote computer is a pointing device.

21. The method of claim 18, wherein an input device of a remote computer is a keyboard.

22. The method of claim 18, wherein a first input device of said remote computer is a keyboard and a second input device of said remote computer is a pointing device.

23. The method of claim 18, wherein said Internet software of a remote computer is Internet browser software.

24. The method of claim 18, wherein said first server and said remote computer communicate, in whole or in part, over a secure connection.

25. The method of claim 18, wherein the size of said user key in bits is evenly divisible by the value 8.

26. The method of claim 18, wherein the size of said encryption key in bits is evenly divisible by the value 8.

27. The method of claim 18, wherein E>U.

28. The method of claim 18, wherein E=U.

29. The method of claim 18, wherein E<U.

30. The method of claim 18, where in step g), said first server additionally assigns an expiration date to the expires field of said cookie.

31. The method of claim 18, where in step g), said first server additionally assigns its base domain value to the domain field of said cookie.

32. The method of claim 18, where in step g), said first server additionally assigns the value TRUE to the secure flag field of said cookie; and the sending and receiving of said cookie between said first server and said remote computer are over a secure connection.

33. The method of claim 18, said method further comprising the steps of:

t) sending by said remote computer said cookie over the Internet to a second server, wherein said second server is within the domain set of said domain value of said cookie;

u) receiving by said second server said cookie from the Internet, wherein said second server extracts said encrypted private data from said cookie and stores said encrypted private data in said second server memory;

v) sending by said user said user key over the Internet to said second server;

w) receiving said user key from the Internet by said second server, said second server storing said user key in said second server memory;

x) recreating by said second server said encryption key from said user key, wherein said step of recreating comprises deleting I bits from said user key at said position K of said user key;

y) decrypting said encrypted private data by said second server by input of said encrypted private data and said encryption key into said cryptography software, the output of said cryptography software being said initial private data; and z) establishing a state between said second server and said user by said second server based on said initial private data.

34. The method of claim 33, said method furter comprising the steps of:

aa) before step f), modifying said initial private data by said first server by inserting a seed into said initial private data according to a particular format;

ab) after step y) and before step z), determining by said second server if said seed is contained in said initial private data according to said particular fonnat; and ac) if said seed is not contained in said initial private data according to said particular format, sending an error message by said second server to said remote computer and skipping step z).

35. A system for creating secure Internet user states between one or more servers and one or more users, said system comprising:
   a first server comprising an operable Internet connection, a server memory, server software, cryptography software, and a CPU for executing said server software and said cryptography software, wherein said server CPU, each of said server memories and said server Internet connection are operatively connected to each other by at least one bus;
   a first user;
   associated with said first user, a remote computer comprising an operable Internet connection, Internet software, one or more computer memories, one or more input devices and a CPU for executing said Internet software, wherein said computer Internet connection, each of said one or more computer memories, each of said one or more input devices and said computer CPU are operatively connected to each other by at least one bus;
   associated with said first user, a user key having a size of U bits where U>0, said user key sent by said first user over the Internet to said first server by one or more inputs by said first user via one or more of said input devices;
   an encryption key having a size of E bits where E>0, said encryption key created by said first server by at least inserting one or more bits into said user key at a position K of said user key, where $1 \geq K \geq U+1$;
   initial private data relating to said first user, said initial private data sent by said first user over the Internet to said first server by one or more inputs by said first user via one or more of said input devices;
   encrypted private data encrypted by said first server by input of said initial private data and said encryption key into said cryptography software;
   a cookie transmitted between said first server and the remote computer of said first user and stored in a computer memory of said remote computer, said cookie comprising a value field and a name field, wherein said first server assigns said encrypted private data to said value field and a name to said name field;
   decrypted private data decrypted by said first server by input of said encrypted private data and said encryption key into said cryptography software; and
   a secure state between said first server and said first user, said state established by said first server based on said decrypted private data.

36. The system of claim 35, said system further comprising:
   a seed, said seed inserted into said initial private data by said first server according to a particular format, wherein said secure state is established by said first server only if said seed is contained in said decrypted private data according to said particular format.

37. The system of claim 35, said system flirther comprising:
   a seed, said seed inserted into said initial private data by said first server according to a particular format; and
   an error message,
   wherein said secure state is established by said first server only if said seed is contained in said decrypted private data according to said particular format, and said error message is sent by said first server to the remote computer of said first user if said seed is not contained in said decrypted private data according to said particular format.

38. The system of claim 35, wherein an input device of a remote computer is a pointing device.

39. The system of claim 35, wherein an input device of a remote computer is a keyboard.

40. The system of claim 35, wherein a first input device of said remote computer is a keyboard and a second input device of said remote computer is a pointing device.

41. The system of claim 35, wherein said Internet software of a remote computer is Internet browser software.

42. The system of claim 35, wherein said first server and the remote computer of said first user communicate, in whole or in part, over a secure connection.

43. The system of claim 35, wherein the size of said user key in bits is evenly divisible by the value 8.

44. The system of claim 35, wherein the size of said encryption key in bits is evenly divisible by the value 8.

45. The system of claim 35, wherein E>U.

46. The system of claim 35, wherein E=U.

47. The system of claim 35, wherein E<U.

48. The system of claim 35, wherein said cookie furlher comprises an expires field, said expires field containing an expiration date assigned by said first server.

49. The system of claim 35, wherein said cookie further comprises a domain field, said domain field containing a domain value assigned by said first server.

50. The system of claim 35, wherein said cookie further comprises a secure flag field, said secure flag field containing the value TRUE assigned by said first server, and the sending and receiving of said cookie between said first server and the remote computer of said first user are over a secure connection.

51. The system of claim 35, wherein said cookie further comprises a domain field having a cookie domain value, said system further comprising:
   a second server, said second server having a second server domain value within said cookie domain value,
   wherein said cookie and said user key are sent by said user over the Internet to said second server, said encryption key recreated by said second server by at least inserting one or more bits into said user key at said position K of said user key, said decrypted private data decrypted by said second server by input of said encrypted private data and said encryption key into said cryptography software; and
   a secure state between said second server and said first users said secure state established by said second server based on said decrypted private data.

52. The system of claim 51, said system further comprising:
   a seed, said seed inserted into said initial private data before encryption by said first server according to a particular format, wherein said secure state between said second server and said first user is established by said second server only if said seed is contained in said decrypted private data according to said particular format.

53. The system of claim 51, said system further comprising:
   a seed, said seed inserted into said initial private data by said first server according to a particular format; and
   an error message,
   wherein said secure state between said second server and said first user is established by said second server only if said seed is contained in said decrypted private data according to said particular format, and said error message is sent by said second server to the remote computer of said first user if said seed is not contained in said decrypted private data according to said particular format.

54. A system for creating secure Internet user states between one or more servers and one or more users, said system comprising:

a first server comprising an operable Internet connection, a server memory, server software, cryptography software, and a CPU for executing said server software and said cryptography software, wherein said server CPU, each of said server memories and said server Internet connection are operatively connected to each other by at least one bus;

a first user;

associated with said first user, a remote computer comprising an operable Internet connection, Internet software, one or more computer memories, one or more input devices and a CPU for executing said Internet software, wherein said computer Internet connection, each of said one or more computer memories, each of said one or more input devices and said computer CPU are operatively connected to each other by at least one bus;

associated with said first user, a user key having a size of U bits where U>0, said user key sent by said first user over the Internet to said first server by one or more inputs by said first user via one or more of said input devices;

an encryption key having a size of E bits, said encryption key created by said first server by at least deleting I bits from said user key at a position K of said user key, where $(1 \geq I<U), (1 \geq K \geq [U-I+1])$ and (E>0);

initial private data relating to said first user, said initial private data sent by said first user over the Internet to said first server by one or more inputs by said first user via one or more of said input devices;

encrypted private data encrypted by said first server by input of said initial private data and said encryption key into said cryptography software;

a cookie transmitted between said first server and the remote computer of said first user and stored in a computer memory of said remote computer, said cookie comprising a value field and a name field, wherein said first server assigns said encrypted private data to said value field and a name to said name field;

decrypted private data decrypted by said first server by input of said encrypted private data and said encryption key into said cryptography software; and a secure state between said first server and said first user, said state established by said first server based on said decrypted private data.

55. The system of claim 54, said system further comprising:

a seed, said seed inserted into said initial private data by said first server according to a particular format, wherein said secure state is established by said first server only if said seed is contained in said decrypted private data according to said particular format.

56. The system of claim 54, said system further comprising:

a seed, said seed inserted into said initial private data by said first server according to a particular format; and an error message, wherein said secure state is established by said first server only if said seed is contained in said decrypted private data according to said particular format, and said error message is sent by said first server to the remote computer of said first user if said seed is not contained in said decrypted private data according to said particular format.

57. The system of claim 54, wherein an input device of a remote computer is a pointing device.

58. The system of claim 54, wherein an input device of a remote computer is a keyboard.

59. The system of claim 54, wherein a first input device of said remote computer is a keyboard and a second input device of said remote computer is a pointing device.

60. The system of claim 54, wherein said Internet software of a remote computer is Internet browser software.

61. The system of claim 54, wherein said first server and the remote computer of said first user communicate, in whole or in part, over a secure connection.

62. The system of claim 54, wherein the size of said user key in bits is evenly divisible by the value 8.

63. The system of claim 54, wherein the size of said encryption key in bits is evenly divisible by the value 8.

64. The system of claim 54, wherein E>U.

65. The system of claim 54, wherein E=U.

66. The system of claim 54, wherein E<U.

67. The system of claim 54, wherein said cookie further comprises an expires field, said expires field containing an expiration date assigned by said first server.

68. The system of claim 54, wherein said cookie further comprises a domain field, said domain field containing a domain value assigned by said first server.

69. The system of claim 54, wherein said cookie flrther comprises a secure flag field, said secure flag field containing the value TRUE assigned by said first server, and the sending and receiving of said cookie between said first server and the remote computer of said first user are over a secure connection.

70. The system of claim 54, wherein said cookie further comprises a domain field having a cookie domain value, said system further comprising:

a second server, said second server having a second server domain value within said cookie domain value, wherein said cookie and said user key are sent by said user over the Internet to said second server, said encryption key recreated by said second server, said decrypted private data decrypted by said second server by input of said encrypted private data and said encryption key into said cryptography software; and a secure state between said second server and said first user is established by said second server based on said decrypted private data.

71. The system of claim 70, said system further comprising:

a seed, said seed inserted into said initial private data before encryption by said first server according to a particular format, wherein said secure state between said second server and said first user is established by said second server only if said seed is contained in said decrypted private data according to said particular format.

72. The system of claim 70, said system further comprising:

a seed, said seed inserted into said initial private data by said first server according to a particular format; and an error message, wherein said secure state between said second server and said first user is established by said second server only if said seed is contained in said decrypted private data according to said particular format, and said error message is sent by said second server to the remote computer of said first user if said seed is not contained in said decrypted private data according to said particular format.

* * * * *